US006947029B2

(12) United States Patent
Katagiri et al.

(10) Patent No.: US 6,947,029 B2
(45) Date of Patent: Sep. 20, 2005

(54) HANDWRITTEN DATA INPUT DEVICE AND METHOD, AND AUTHENTICATING DEVICE AND METHOD

(76) Inventors: Masaji Katagiri, c/o NTT Docomo, Inc., 11-1, Nagata-cho 2-chome, Chiyoda-ku (JP), 100-6150; Toshiaki Sugimura, c/o NTT Docomo, Inc., 11-1, Nagata-cho 2-chome, Chiyoda-ku (JP), 100-6150; Hirotaka Nakano, c/o NTT Docomo, Inc., 11-1, Nagata-cho 2-chome, Chiyoda-ku (JP), 100-6150; Hiroshi Inaba, c/o Matshushita Communication Industrial Co., LTD, 3-1, Tsunashima-Higashi 4-chome, Kohoku-ku Yokohama-shi, Kanagawa (JP), 223-8639; Tsutomu Akasaka, c/o Matshushita Communication Industrial Co., LTD, 3-1, Tsunashima-Higashi 4-chome, Kohoku-ku Yokohama-shi, Kanagawa (JP), 223-8639; Toshiaki Chai, c/o Cyber Sign Japan Inc., TE Building, 5-16, Yoga 4-chome, Setagaya-ku, Tokyo (JP), 158-0097; Toshihiro Yasuda, c/o Cyber Sign Japan Inc., TE Building, 5-16, Yoga 4-chome, Setagaya-ku, Tokyo (JP), 158-0097

( * ) Notice: Subject to any disclaimer, the term of this patent is extended or adjusted under 35 U.S.C. 154(b) by 226 days.

(21) Appl. No.: 10/182,602

(22) PCT Filed: Aug. 3, 2001

(86) PCT No.: PCT/JP01/06705

§ 371 (c)(1),
(2), (4) Date: Jul. 31, 2002

(87) PCT Pub. No.: WO02/054217

PCT Pub. Date: Jul. 11, 2002

(65) Prior Publication Data

US 2003/0001818 A1 Jan. 2, 2003

(30) Foreign Application Priority Data

Dec. 27, 2000 (JP) ...................................... 2000-397636
Dec. 27, 2000 (JP) ...................................... 2000-398040

(51) Int. Cl.[7] ................................................ G09G 5/08

(52) U.S. Cl. ......................... 345/158; 345/179; 463/36

(58) Field of Search ................................ 345/156, 158, 345/179; 463/36; 178/19.01, 19.05, 19.07

(56) References Cited

U.S. PATENT DOCUMENTS 3,846,826 A * 11/1974 Mueller ................. 348/207.99
3,889,056 A * 6/1975 Mayer et al. ................. 380/54

(Continued)

FOREIGN PATENT DOCUMENTS

JP A 60-60502 4/1985
JP A 10-154036 6/1998

(Continued)

OTHER PUBLICATIONS

PTO 2004–5432; Translation of JP–60–060502.*

*Primary Examiner*—Alexander Eisen
(74) *Attorney, Agent, or Firm*—Oliff & Berridge, PLC

(57) ABSTRACT

There are provided a device and method for enabling entry of handwritten data, such as a signature, without use of an electronic tablet. In step S2-1, a user affixes a signature by means of moving a pen device 30 in midair. In step S2-2, camera means 20 photographs the pen device 30 and outputs the resultant image data. In step S2-3, coordinate computation means 22 determines coordinates of a pen tip of the pen means 30 on a screen on the basis of the image data (motion picture data), thereby determining signature data. In step S2-4, comparison verification means 40 compares and verifies the thus-determined signature data with reference data. If a similarity exists between the signature data and the reference data, there is output an authentication result showing "authentication of verification." Thus, personal identification can be effected on the basis of the signature data written by the user in midair.

24 Claims, 11 Drawing Sheets

U.S. PATENT DOCUMENTS

| | | | | | |
|---|---|---|---|---|---|
| 6,044,165 | A | * | 3/2000 | Perona et al. | 382/103 |
| 6,100,538 | A | * | 8/2000 | Ogawa | 250/559.29 |
| 6,118,889 | A | * | 9/2000 | Izuno et al. | 382/119 |
| 6,545,670 | B1 | * | 4/2003 | Pryor | 345/173 |
| 6,707,444 | B1 | * | 3/2004 | Hendriks et al. | 345/156 |

FOREIGN PATENT DOCUMENTS

| | | |
|---|---|---|
| JP | A 10-222241 | 8/1998 |
| JP | A 2000-56916 | 2/2000 |
| JP | A 2000-268130 | 9/2000 |
| JP | A 2000-357046 | 12/2000 |
| JP | A 2001-84089 | 3/2001 |

* cited by examiner

HANDWRITTEN DATA INPUT DEVICE AND METHOD, AND AUTHENTICATING DEVICE AND METHOD

FIELD OF THE INVENTION

The invention relates to an apparatus and method for enabling entry of handwritten data, such as a signature. Particularly, the invention relates to an apparatus and method for enabling entry of a signature used for personal identification.

BACKGROUND ART

A personal identification method utilizing signature data is widely known as one personal identification method for identifying a person.

This method usually requires an input apparatus called an electronic tablet for enabling entry of signature data. Moreover, the electronic tablet must have a writing surface of sufficient size for a user to write a signature. When the user writes a signature on the writing surface, the electronic table acquires time-sequence data pertaining to coordinates of the pen tip, writing pressure of a pen, or the like are acquired by the electronic tablet. The thus-acquired data are utilized as signature data for personal identification.

DISCLOSURE OF THE INVENTION

As mentioned above, the electronic tablet must have a certain size and area in light of the nature thereof, thus imposing a limitation on miniaturization (or a reduction in the area of) the tablet.

Incorporating such an electronic tablet into a compact electronic device, such as a portable cellular phone, is usually difficult. There is a high probability of forceful incorporation of an electronic tablet into a portable cellular phone hindering miniaturization of the portable cellular phone.

When signature data are input into a common electronic device other than a portable cellular phone, the electronic device must employ the previously-described electronic tablet having a predetermined area. Even in the case of a common electronic device, use of an electronic tablet is a contributing factor to imposing given limitations on the design of the electronic device.

The invention has been conceived in view of the problem, and a first object of the invention is to provide an apparatus and method for enabling entry of handwritten data, such as a signature, without use of an electronic tablet. Further, the invention aims at providing an apparatus and method which enable personal identification based on signature data by means of utilization of the apparatus and method.

As will be described later, in order to achieve the object, the inventors of the invention propose an apparatus and method which enable acquisition of signature data from image data by means of photographing a signing action to be performed in midair by a user through use of a pen. Here, the expression "signing action" means that a user moves his/her hand as if affixing a signature in midair.

In the case of entry of signature data by way of an electronic tablet, data pertaining to a writing pressure are often detected, and the data also constitute a portion of signature data. In contrast, the apparatus/method which enables acquisition of signature data by means of photographing a signing action performed in midair can obtain time-series data pertaining to two-dimensional coordinates on a screen but encounters difficulty in obtaining third data, such as a writing pressure.

Therefore, related-art signature matching is effected by means of matching three-dimensional data consisting of three types of data, such as a vertical coordinate, a horizontal coordinate, and a writing pressure. In contrast, according to the technique involving performance of signing action in midair, there is effected matching of two-dimensional data consisting of vertical and horizontal coordinates. Consequently, the technique is presumed to be lower in precision than related-art personal identification.

The invention has been conceived in light of the problems, and a second object of the invention is to provide signature data of higher accuracy when signature data are obtained by means of photographing a signing action to be performed in midair.

To solve the problem, the invention provides a handwritten data input apparatus which acquires handwritten data written in midair by a user moving a pen device in midair, the apparatus comprising:

camera means for acquiring motion picture data pertaining to the pen device moved by the user; and coordinate computation means which determines time-series data pertaining to coordinates of a pen tip on a screen of the motion picture data, on the basis of motion picture data pertaining to the pen device acquired by the camera means.

By means of such a configuration, handwritten data pertaining to a character or drawing written in midair can be acquired as time-series data pertaining to coordinates.

The handwritten data input apparatus of the invention is further characterized in that the pen device has illumination means, and the coordinate computation means computes coordinates of the illumination means on the screen.

By means of such a configuration, determination of coordinates on a screen is facilitated by the light originating from the illumination means.

The handwritten data input apparatus of the invention is further characterized in that the illumination means of the pen device is switchable between an illuminated state and an extinguished state, and the coordinate computation means computes coordinates of the illumination means on the screen from when the illumination has entered an illuminated state until the illumination means enters an extinguished state.

By means of such a configuration, the user can explicitly show the start and end of handwritten data.

The handwritten data input apparatus of the invention is further characterized in that the coordinate computation means computes coordinates of the pen device on the screen from a start time in which the pen device has started moving on the screen from a stationary state longer than a predetermined first period until a stop time in which the pen device stops moving as a result of having entered a stationary state longer than a predetermined second period.

By means of such a configuration, the start and end of handwritten data can be explicitly indicated even when the pen device is not equipped with illumination means.

The handwritten data input apparatus of the invention is further characterized in that the coordinate computation means determines the pen device to be at rest when a change in coordinates of the pen device is smaller than a predetermined level.

In reality, there are considered to be many cases where, when a person attempts to lay a pen device to rest in midair, slight fluctuations arise in the pen device. Therefore, in actuality, movements smaller than a predetermined level are preferably determined to represent the stationary state.

The handwritten data input apparatus of the invention is further characterized in that the coordinate computation means informs the user of commencement of input of handwritten data when the pen device is determined to be at rest for a period longer than the first period and informs the user of termination of input of handwritten data when the pen device is determined to be at rest for a period longer than the second period.

By means of such a configuration, the user can readily ascertain a timing at which signing action is to be started and ascertain whether or not the apparatus has recognized completion of the signing action.

The handwritten data input apparatus of the invention is further characterized in that the coordinate computation means informs the user of commencement of input of handwritten data by means of sound or informs termination of input of handwritten data by means of sound.

By means of such a configuration, the user can readily ascertain commencement of input of handwritten data by means of sound and ascertain whether or not the apparatus has recognized completion of the signing action.

The handwritten data input apparatus of the invention is further characterized in that the coordinate computation means recognizes a start time and end time of computation of handwritten data by means of external sounds.

By means of such a configuration, the start time/end time are explicitly instructed by sounds.

The handwritten data input apparatus of the invention is further characterized in that the sounds are the voice of the user or sounds of a pen switch provided on the pen device.

By means of such a configuration, the user can clearly show the start time/end time of handwritten data through use of his/her own voice or sounds of a pen switch.

The handwritten data input apparatus according to the invention further comprises display means for displaying the time-series data pertaining to coordinates.

By means of such a configuration, the user can visually ascertain time-series data pertaining to handwritten data.

The invention also provides a personal identification apparatus equipped with the above-described handwritten data input apparatus, the personal identification apparatus comprising:

storage means in which are stored beforehand reference data serving as signature data pertaining to an authorized person; and comparison verification means which verifies the user's signature data input as handwritten data by the handwritten data input apparatus against the reference data and outputs authentication of identification when the handwritten data and the signature data are determined to be a signature affixed by the same person.

By means of such a configuration, there is obtained a personal identification apparatus having the same function as those of the pieces of handwritten data input apparatus, and personal identification can be performed by use of signature data written in midair.

In order to solve the problem, the invention provides a handwritten data input method by which handwritten data written in midair are acquired by means of a user moving a pen device in midair, the method comprising:

an acquisition step of acquiring motion picture data pertaining to a pen device moved by the user; and a coordinate computation step of determining time-series data pertaining to coordinates of a pen tip on a screen of the motion picture data, on the basis of the acquired motion picture data pertaining to the pen device.

By means of such a configuration, handwritten data pertaining to characters or graphics written in midair can be acquired as time-series data pertaining to coordinates.

The handwritten data input method of the invention is further characterized in that the pen device has illumination means, and coordinates of the illumination means on the screen are computed in the coordinate computation step.

By means of such a configuration, determination of coordinates on a screen is facilitated by means of light originating from illumination means.

The handwritten data input method of the invention is further characterized in that the illumination means of the pen device is switchable between an illuminated state and extinguished state, and, in the coordinate computation step, there are computed coordinates of the illumination means on the screen from when the illumination means has entered an illuminated state until the illumination means enters an extinguished state.

By means of such a configuration, the user can explicitly show the start and end of handwritten data.

The handwritten data input method of the invention is further characterized in that, in the coordinate computation step, there are computed coordinates of the pen device on the screen from a start time in which the pen device has started moving on the screen from a stationary state longer than a predetermined first period until a stop time in which the pen device stops moving as a result of having entered a stationary state longer than a predetermined second period.

By means of such a configuration, the start and end of and written data can be explicitly indicated even when the pen device is not provided with illumination means.

The handwritten data input method of the invention is further characterized in that, in the coordinate computation step, the pen device is determined to be at rest when a change in coordinates of the pen device is smaller than a predetermined level.

In reality, there are considered to be many cases where, when a person attempts to lay a pen device at rest in midair, slight fluctuations arise in the pen device. Therefore, in actuality, movements smaller than a predetermined level are preferably determined to represent the stationary state.

The handwritten data input method is further characterized in that, in the coordinate computation step, the user is informed of commencement of input of handwritten data when the pen device is determined to be at rest for a period longer than the first period and is informed of termination of input of handwritten data when the pen device is determined to be at rest for a period longer than the second period.

By means of such a configuration, the user can readily ascertain a timing at which signing action is to be started and ascertain whether or not the apparatus has recognized completion of the signing action.

The handwritten data input method of the invention is further characterized in that, in the coordinate computation step, the user is informed of commencement of input of handwritten data by means of sound or informs termination of input of handwritten data by means of sound.

By means of such a configuration, the user can readily ascertain commencement of input of handwritten data by means of sound and ascertain whether or not the apparatus has recognized completion of the signing action.

The handwritten data input method of the invention is further characterized in that, in the coordinate computation step, a start time and end time of computation of handwritten data are recognized by means of external sounds.

By means of such a configuration, the start time/end time are explicitly instructed by sounds.

The handwritten data input method is further characterized in that the sounds are the voice of the user or sounds of a pen switch provided on the pen device.

By means of such a configuration, the user can clearly show the start time/end time of handwritten data through use of his/her own voice or sounds of a pen switch.

The invention also provides a personal identification method including the above-described handwritten data input method, the personal identification method comprising:

a comparison verification step in which the user's signature data input as handwritten data by the handwritten data input method are verified against and compared with the reference data which are stored beforehand and serve as signature data pertaining to an authorized user, and authentication of identification is output when the handwritten data and the signature data are determined to be a signature affixed by the same person.

By means of such a configuration, there is obtained a personal identification apparatus having the same operation as that of the pieces of handwritten data input apparatus. Particularly, there can be acquired signature data written in midair (in three-dimensional space), and the signature data can be utilized for personal identification.

The invention provides a handwritten data input apparatus which acquires handwritten data written on a midair plane parallel to the surface of a predetermined flat plate by means of a user moving a pen device along the surface of the flat plate, the apparatus comprising:

camera means for acquiring motion picture data pertaining to a pen device moved by the user; and coordinate computation means which determines time-series data pertaining to coordinates of a pen tip on a screen of the motion picture data, on the basis of motion picture data pertaining to the pen device acquired by the camera means.

By means of such a configuration, the user can write handwritten data on a flat plate, and the flat plate can be utilized as a guide at the time of drawing. A transparent plate; e.g., a flat glass plate, is preferable as a flat plate. Further, photographing the handwritten data from an angle oriented to a surface opposite the surface on which handwritten data are written is also preferable.

The invention also provides a handwritten data input apparatus for acquiring handwritten data written in midair by means of a user moving a finger in midair, comprising:

camera means for acquiring motion picture data pertaining to the finger moved by the user; and coordinate computation means for determining time-series data pertaining to coordinates of the finger on a screen of the motion picture data, on the basis of the motion picture data pertaining to the finger acquired by the camera means.

By means of such a configuration, the user can enter handwritten data written with his/her finger without use of a pen device.

The handwritten data input apparatus of the invention is further characterized in that the finger is provided with a marker, and the coordinate computation means determines time-series data pertaining to coordinates of the marker of the finger.

By means of such a configuration, computation of coordinates of a finger is facilitated by a marker.

The invention also provides a handwritten data input method for acquiring handwritten data written in midair by means of a user moving a finger in midair, comprising:

an acquisition step of acquiring motion picture data pertaining to the finger moved by the user; and a coordinate computation step of determining time-series data pertaining to coordinates of the finger on a screen of the motion picture data, on the basis of the acquired motion picture data pertaining to the finger.

By means of such a configuration, coordinates of a finger can be computed readily with a marker.

The handwritten data input method of the invention is further characterized in that the finger is provided with a marker, and, in the coordinate computation step, time-series data pertaining to coordinates of the marker of the finger are determined.

By means of such a configuration, computation of coordinates of a finger is facilitated by a marker.

The handwritten data input apparatus is further characterized in that the illumination means emits modulated light, and the coordinate computation means computes coordinates of a portion of the motion picture data corresponding to the modulated light.

The handwritten data input method is further characterized in that the illumination means emits modulated light, and in the coordinate computation step, computation coordinates of a portion of the motion picture data corresponding to the modulated light is carried out.

By means of the configuration of the invention, coordinates of a pen device (or illumination means) can be determined readily by means of selecting only modulated light.

There will now be described means of the invention for achieving a second object.

In order to solve the problem, the invention provides a handwritten data input apparatus which acquires handwritten data written in midair by means of a user moving a pen device in midair, the apparatus comprising:

first camera means for acquiring first motion picture data pertaining to the pen device moved by the user;

second camera means for acquiring second motion picture data pertaining to the pen device from an angle different from that of the first camera means; and coordinate computation means for determining three-dimensional coordinates of the pen device in midair (in a three-dimensional space) on the basis of the sets of first and second motion picture data and determining time-series data pertaining to the coordinates.

By means of such a configuration, handwritten data pertaining to characters or graphics can be acquired as time-series data pertaining to three-dimensional coordinates.

The handwritten data input apparatus of the invention is further characterized in that the pen device has illumination means, and the coordinate computation means computes coordinates of the illumination means on the screen.

By means of such a configuration, coordinates can be determined by means of light originating from the illumination means.

The handwritten data input apparatus of the invention is further characterized in that the illumination means of the pen device is switchable between an illuminated state and extinguished state, and the coordinate computation means computes coordinates of the illumination means on the screen from when the illumination has entered an illuminated state until the illumination means enters an extinguished state.

By means of the configuration, the user can explicitly show the start and end of handwritten data.

The handwritten data input apparatus of the invention is further characterized in that the coordinate computation means computes coordinates of the pen device on the screen from a start time in which the pen device has started moving on the screen from a stationary state longer than a predetermined first period until a stop time in which the pen device stops moving as a result of having entered a stationary state longer than a predetermined second period.

By means of such a configuration, the start and end of handwritten data can be explicitly indicated even when the pen device is not equipped with illumination means.

The handwritten data input apparatus of the invention is further characterized in that the coordinate computation means determines the pen device to be at rest when a change in coordinates of the pen device is smaller than a predetermined level.

In reality, there are considered to be many cases where, when a person attempts to lay a pen device at rest in midair, slight fluctuations arise in the pen device. Therefore, in actuality, movements smaller than a predetermined level are preferably determined to represent the stationary state.

The handwritten data input apparatus is further characterized in that the coordinate computation means informs the user of commencement of input of handwritten data when the pen device is determined to be at rest for a period longer than the first period and informs the user of termination of input of handwritten data when the pen device is determined to be at rest for a period longer than the second period.

By means of such a configuration, the user can readily ascertain a timing at which signing action is to be started and ascertain whether or not the apparatus has recognized termination of the signing action.

The handwritten data input apparatus of the apparatus is further characterized in that the coordinate computation means informs the user of commencement of input of handwritten data by means of sound or informs termination of input of handwritten data by means of sound.

By means of such a configuration, the user can readily ascertain commencement of input of handwritten data by means of sound and ascertain whether or not the apparatus has recognized completion of the signing action.

The handwritten data input apparatus is further characterized in that the coordinate computation means recognizes a start time and end time of computation of handwritten data by means of external sounds.

By means of such a configuration, the start time/end time are explicitly instructed by sounds.

The handwritten data input apparatus of the invention is further characterized in that the sounds are the voice of the user or sounds of a pen switch provided on the pen device.

By means of such a configuration, the user can clearly show the start time/end time of handwritten data through use of his/her own voice or sounds of a pen switch.

The handwritten data input apparatus of the invention is further characterized by further comprising display means for displaying the time-series data pertaining to coordinates.

By means of such a configuration, the user can visually ascertain time-series data pertaining to handwritten data.

The invention also provides a personal identification apparatus equipped with the handwritten data input apparatus, the personal identification apparatus comprising:

storage means in which are stored beforehand reference data serving as signature data pertaining to an authorized person; and comparison verification means which verifies the user's signature data input as handwritten data by the handwritten data input apparatus against the reference data by means of comparison and outputs authentication of identification when the handwritten data and the signature data are determined to be a signature affixed by the same person.

By means of such a configuration, there is obtained a personal identification apparatus having the same operation as that of the pieces of handwritten data input apparatus. Particularly, since signature data in the form of three-dimensional data are utilized, highly accurate personal identification can be achieved.

To solve the problem the invention also provides a handwritten data input method by which handwritten data written in midair are acquired by means of a user moving a pen device in midair, the method comprising:

a first acquisition step of acquiring first motion picture data pertaining to a pen device moved by the user from a first angle;

a second acquisition step of acquiring second motion picture data pertaining to a pen device moved by the user from a second angle different from the first angle; and a coordinate computation step of determining three-dimensional coordinates of the pen device in midair (i.e., in a three-dimensional space) on the basis of the acquired sets of first and second motion picture data pertaining to the pen device and determining time-series data pertaining to the coordinates.

By means of such a configuration, handwritten data pertaining to characters and graphics can be acquired in the form of time-series data pertaining to three-dimensional coordinates.

The handwritten data input method of the invention is further characterized in that the pen device has illumination means, and coordinates of the illumination means on the screen are computed in the coordinate computation step.

By means of the configuration, three-dimensional coordinates in three-dimensional space can be determined readily by means of light originating from the illumination means.

The handwritten data input method of the invention is further characterized in that the illumination means of the pen device is switchable between an illuminated state and extinguished state, and, in the coordinate computation step, there are computed coordinates of the illumination means on the screen from when the illumination has entered an illuminated state until the illumination means enters an extinguished state.

By means of such a configuration, the start time/end time are explicitly instructed by sounds.

The handwritten data input method of the invention is further characterized in that there are computed, in the coordinate computation step, three-dimensional coordinates of the pen device in three-dimensional space from a start time in which the pen device has started moving on the screen from a stationary state longer than a predetermined first period until a stop time in which the pen device stops moving as a result of having entered a stationary state longer than a predetermined second period.

By means of such a configuration, the start and end of handwritten data can be explicitly indicated even when the pen device is not equipped with illumination means.

The handwritten data input method of the invention is further characterized in that, in the coordinate computation step, the pen device is determined to be at rest when a change in coordinates of the pen device is smaller than a predetermined level.

In reality, there are considered to be many cases where, when a person attempts to lay a pen device at rest in midair, slight fluctuations arise in the pen device. Therefore, in actuality, movements smaller than a predetermined level are preferably determined to represent the stationary state.

The handwritten data input method of the invention is further characterized in that, in the coordinate computation step, the user is informed of commencement of input of handwritten data when the pen device is determined to be at rest for a period longer than the first period and is informed of termination of input of handwritten data when the pen device is determined to be at rest for a period longer than the second period.

By means of such a configuration, the user can readily ascertain a timing at which signing action is to be started and ascertain whether or not the apparatus has recognized termination of the signing action.

The handwritten data input method of the invention is further characterized in that, in the coordinate computation step, the user is informed of commencement of input of handwritten data by means of sound or informs termination of input of handwritten data by means of sound.

By means of such a configuration, the user can readily ascertain commencement of input of handwritten data by means of sound and ascertain whether or not the apparatus has recognized completion of the signing action.

The handwritten data input method of the invention is further characterized in that, in the coordinate computation step, a start and end time of computation of handwritten data are recognized by means of external sounds.

By means of such a configuration, the start time/end time are explicitly instructed by sounds.

The handwritten data input method of the invention is further characterized in that the sounds are the voice of the user or sounds of a pen switch provided on the pen device.

By means of such a configuration, the user can clearly show the start time/end time of handwritten data through use of his/her own voice or sounds of a pen switch.

The invention also provides a personal identification method including the handwritten data input method, the personal identification method comprising:

a comparison verification step in which the user's signature data input as handwritten data by the handwritten data input apparatus are verified against and compared with the reference data which are stored beforehand and serve as signature data pertaining to an authorized user, and there is output authentication of identification when the handwritten data and the signature data are determined to be a signature affixed by the same person.

By means of such a configuration, there is obtained a personal identification apparatus having the same operation as that of the pieces of handwritten data input apparatus. Particularly, since signature data in the form of three-dimensional data are utilized, highly accurate personal identification can be achieved.

The invention also provides a handwritten data input apparatus for acquiring handwritten data written in midair by means of a user moving a finger in midair, comprising:

first camera means for acquiring first motion picture data pertaining to the finger moved by the user;

second camera means for acquiring second motion picture data pertaining to the finger from an angle different from that of the first camera means; and coordinate computation means for determining three-dimensional coordinates of the finger in three-dimensional space on the basis of the sets of first and second motion picture data and determining time-series data pertaining to the coordinates.

By means of such a configuration, the user can clearly show the start time/end time of handwritten data through use of his/her own voice or sounds of a pen switch.

The handwritten data input apparatus of the invention is further characterized in that the finger is provided with a marker, and the coordinate computation means determines time-series data pertaining to coordinates of the marker of the finger.

By means of such a configuration, the marker facilitates computation of coordinates of the finger.

The invention also provides a handwritten data input method for acquiring handwritten data written in midair by means of a user moving a finger in midair, comprising:

a first acquisition step of acquiring first motion picture data pertaining to the finger moved by the user;

a second acquisition step of acquiring second motion picture data pertaining to the finger from an angle different from that employed in the first acquisition step; and a coordinate computation step of determining three-dimensional coordinates of the finger in three-dimensional space on the basis of the sets of first and second motion picture data and determining time-series coordinate pertaining to the coordinates.

By means of such a configuration, the user can clearly show the start time/end time of handwritten data through use of his/her own voice or sounds of a pen switch.

The handwritten data input method of the invention is further characterized in that the finger is provided with a marker, and, in the coordinate computation step, time-series data pertaining to coordinates of the marker of the finger are determined.

By means of such a configuration, the marker facilitates computation of coordinates of the finger.

The handwritten data input apparatus of the invention is further characterized in that the illumination means emits modulated light, and the coordinate computation means computes coordinates of a portion of the motion picture data corresponding to the modulated light.

The handwritten data input method of the invention is further characterized in that the illumination means emits modulated light, and, in the coordinate computation step, coordinates of a portion of the motion picture data corresponding to the modulated light are computed.

By means of the configuration of the invention, coordinates of a pen device (or illumination means) can be determined readily by means of selecting only modulated light.

BEST MODES FOR IMPLEMENTING THE INVENTION

A first group of preferred embodiments of the invention will be described hereinbelow by reference to the drawings.

Embodiment A-1

Figure 1:
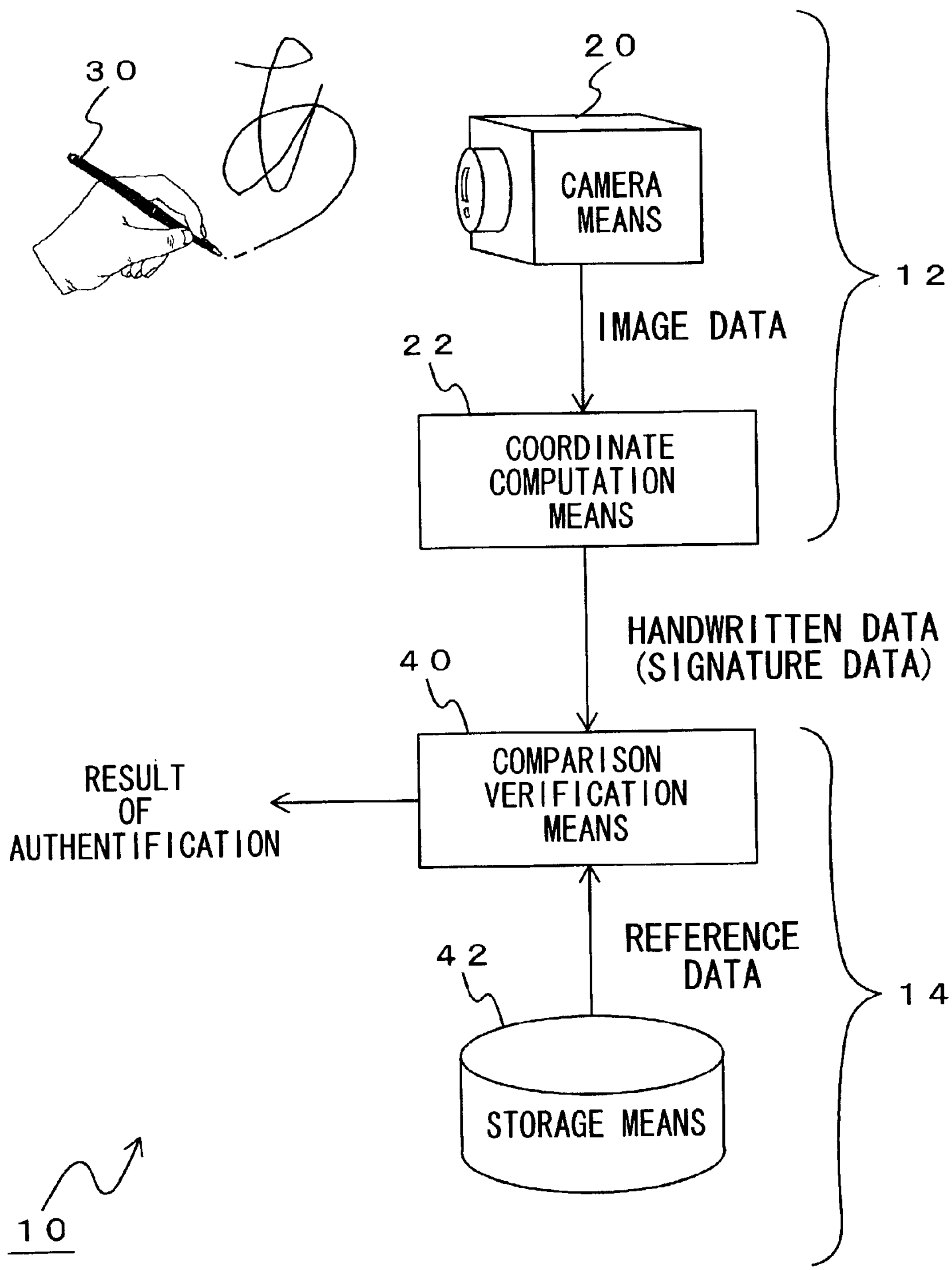
FIG. 1 is a block diagram showing the configuration of a personal identification apparatus according to a preferred embodiment A-1 of the invention.

FIG. 1 is a block diagram showing the configuration of a personal identification apparatus 10 according to a preferred embodiment A-1 of the invention. As illustrated, the personal identification apparatus 10 comprises handwritten data input means 12 for enabling entry of signature data which are handwritten data pertaining to a user; and signature matching means 14 which verifies the handwritten data against previously-recorded signature data through comparison, to thereby determine whether or not personal identification is authenticated.

The handwritten data input means 12 comprises camera means 20, and coordinate computation means 22. The camera means 20 photographs an image of a pen device 30 to be moved in midair by a user and outputs image data in the form of motion pictures. The coordinate computation means 22 computes time-series data pertaining to coordinates of the pen tip of the pen device 30 from the set of image data. The coordinates are coordinates on a screen of image data; that is, two-dimensional values. Time-series data pertaining to the coordinates represent handwritten data written in midair by the user through use of the pen device 30.

When the user has written a signature in midair, the handwritten data can be utilized as signature data which are to become an object of personal identification.

The signature matching means 14 has comparison verification means 40 and storage means 42.

The comparison verification means 40 verifies the handwritten data (signature data) output from the coordinate computation means 22 by means of comparison with reference data previously stored in the storage means 42. If the result of comparison shows that the handwritten data are similar to the reference data to such an extent that the handwritten data can be determined to be affixed by one and the same person, an authentication result showing "Identification is authenticated" is output. Here, the expression "reference data" means signature data previously registered by the original user.

Figure 2:
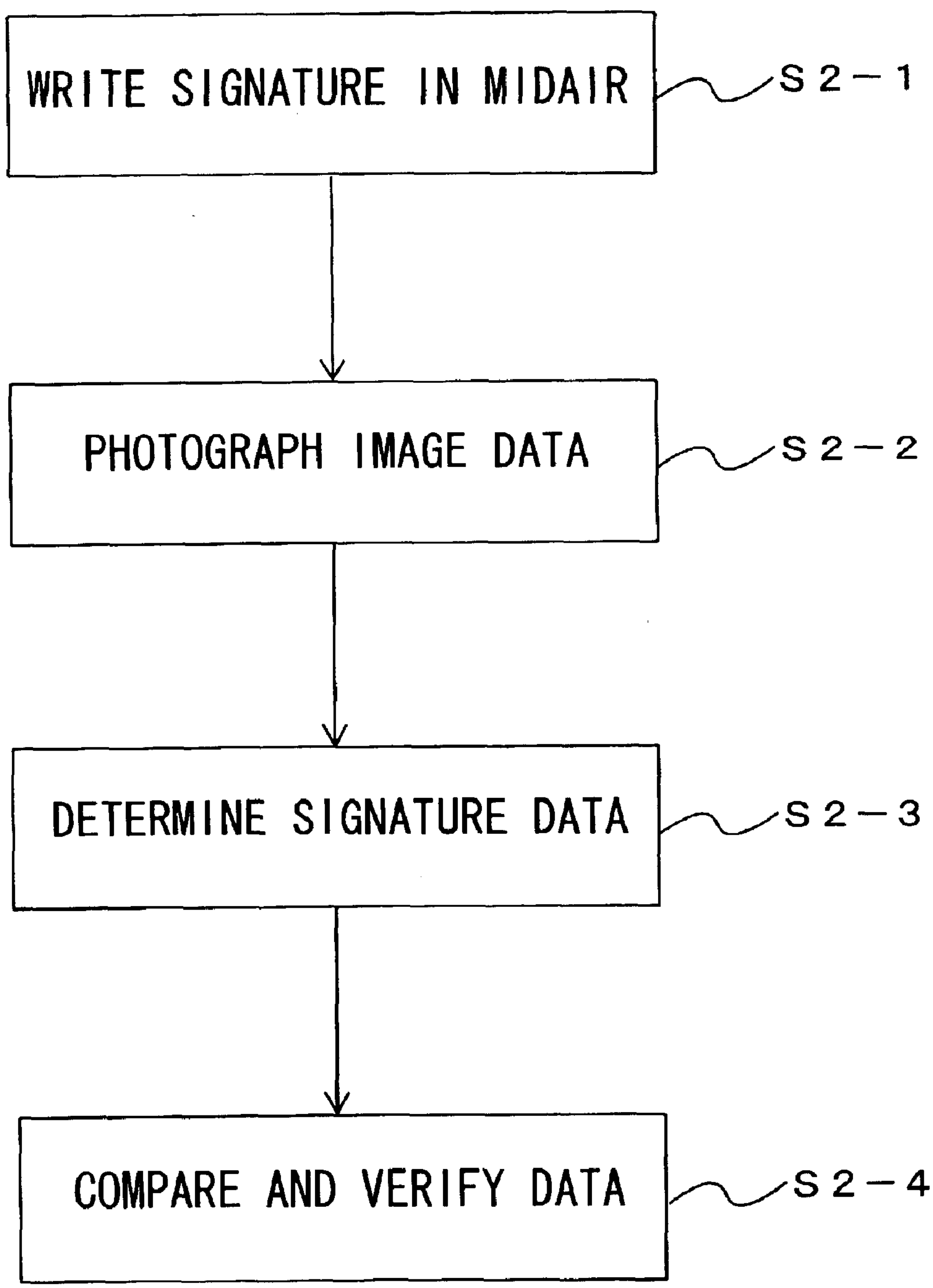
FIG. 2 is a flowchart showing the flow of an operation of a personal identification method according to the embodiment A-1.

Detailed personal identification operation of the personal identification apparatus 10; that is, an operation of the personal identification method, will now be described by reference to a flowchart shown in FIG. 2.

Figure 3:
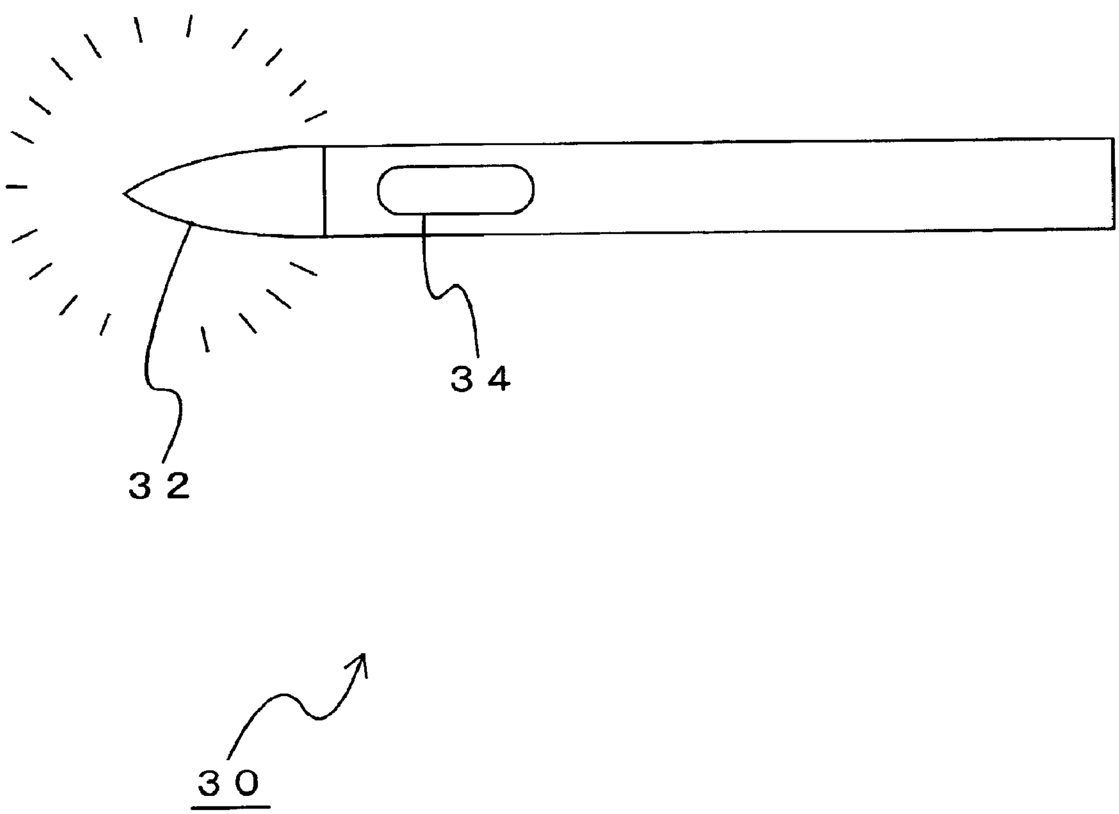
FIG. 3 is a descriptive view of a pen device.

In step S2-1, the user affixes a signature by means of moving the pen device 30 in midair. FIG. 3 is a descriptive view of the pen device 30. As illustrated, illumination means 32 is provided at the tip end of the pen device 30. The illumination means 32 has an LED (light-emitting diode) and a lamp and can illuminate light.

The pen device 30 has a button switch 34. The user can activate or deactivate the illumination means 32, by means of actuating the button switch 34 with a finger.

First, the user activates the illumination means 32 by use of the button switch 34, thereby indicating commencement of a signing action. The user performs a signing action while the illumination means 32 remains illuminated. At a point in time when the signing action has been completed, the user actuates the button switch 34, thereby deactivating the illumination means 32. The deactivating operation enables indication of the end of the signing action.

The pen device 30 having the illumination means 32 is utilized in the embodiment A-1 for two reasons; (1) for explicitly pointing out the start and end of signing action in the manner as mentioned previously; and (2) for facilitating detection of coordinates of the pen tip. These actions will be discussed in detail later.

In step S2-2, the camera means 20 photographs the pen device 30 and outputs resultant image data. The camera means 20 corresponds to a video camera. The image data to be output are motion picture data of 120 frames/sec or thereabouts. In this way, in step S2-3 motion picture data are acquired.

A common video camera which outputs motion picture data of 15 to 30 frames/sec or thereabouts can also be utilized, although accuracy of personal identification is lowered slightly.

In step S2-3, the coordinate computation means 22 determines coordinates of the pen means 30 on the screen on the basis of the image data (motion picture data), thereby determining time-series data pertaining to coordinates; i.e., signature data.

At this time, the coordinate computation means 22 seeks coordinates of a portion of the image data having a high brightness level. Specifically speaking, an area of the image data whose brightness level is greater than or equal to than a predetermined threshold level $\alpha$ is extracted, and the centroid of brightness of the area is determined. The position of the centroid is deemed as the pen tip, and coordinates of the pen tip are determined. Every portion of the pen device 30 may be used for determining the position of centroid. In general, the "tip" of a pen is easy to photograph, and hence determination of coordinates of the "pen tip" is considered to be desirable.

In this way, in the embodiment A-1, the position of the pen device can be readily determined from image data by use of the pen device 30 having the illumination means 32.

In the embodiment A-1, coordinates of the pen device 30 are determined on the screen. This operation is intrinsically the equivalent of projecting the position of the pen device 30 onto a virtual plane in space and determining coordinates of the point of projection.

Figure 4:
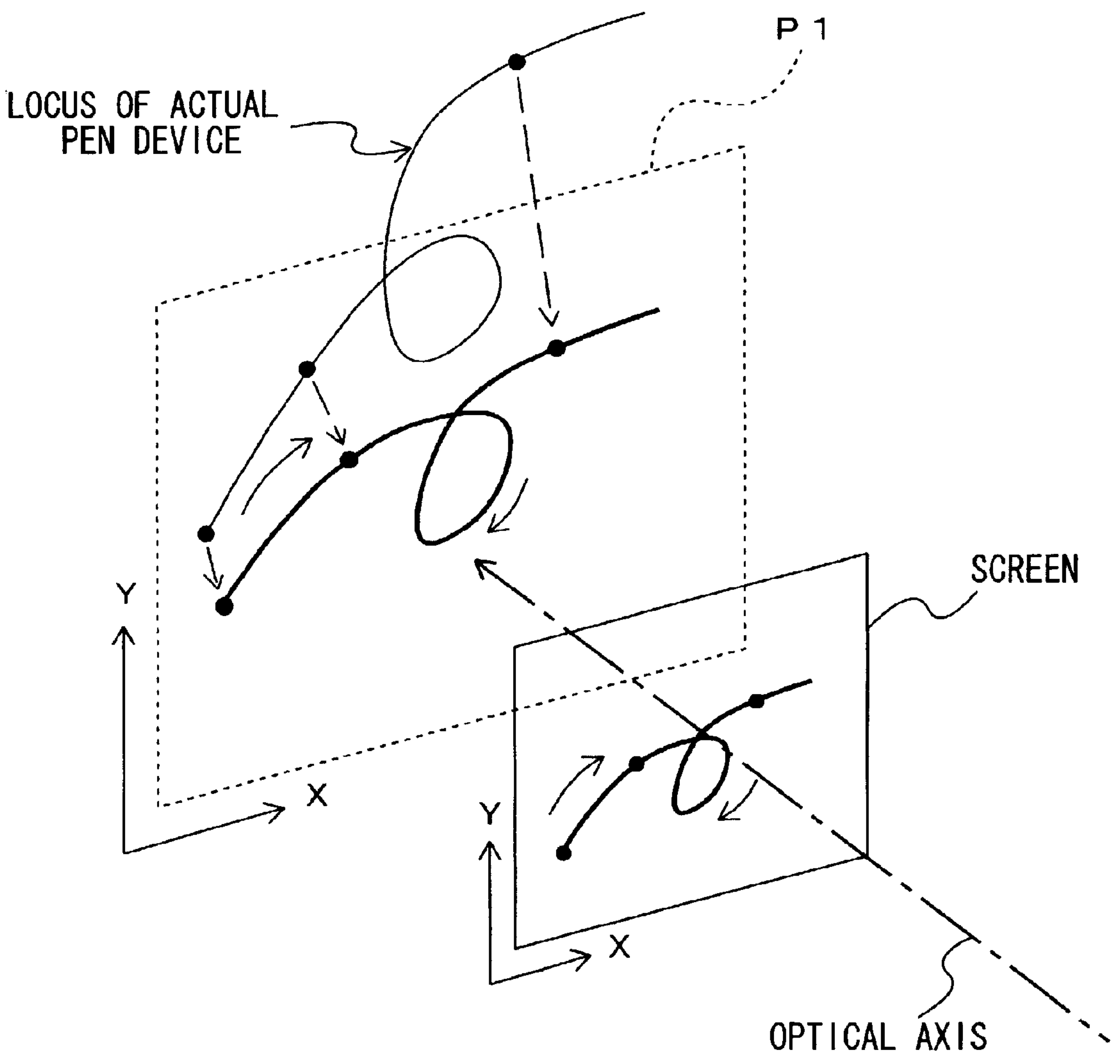
FIG. 4 is a descriptive view of computation of coordinates.

FIG. 4 is a descriptive view of a virtual plane P1 to be used at the time of calculation of coordinates. The plane P1 is parallel to the screen, and both the plane P1 and the screen are perpendicular to the optical axis of the camera means 20. A trail of the pen device 30 on the screen appearing in the image data is similar to a trail produced when the locus of the pen device 30 in space stemming from the user having performed a signing action is projected onto the virtual plane P1. Those trails correspond to essentially the same data.

Consequently, determination of a horizontal coordinate (i.e., the X coordinate in FIG. 4) and a longitudinal coordinate (i.e., the Y coordinate in FIG. 4) on the screen is substantially the equivalent of determining data pertaining to coordinates of a trail on the plane P1 produced when the locus of the pen device 30 stemming from the user having performed a signing action is projected onto the plate P1.

The coordinate computation means 22 determines a start time and a finish time of signature data corresponding to time-series data, as follows.

First, a point in time when an area having a predetermined threshold brightness level or higher has appeared in image data is determined to be a point in time when the user has started a signing action, and time-series data originating from that point in time are taken as signature data.

Next, a point in time when the area having a predetermined threshold brightness level or higher has disappeared from the image data is determined to be a point in time when the user has completed the signing action, and the time-series data that have been generated up to that point in time are taken as signature data.

Since the coordinate computation means 22 performs such an operation, this means can readily determine the start and end of signature data in accordance with the user's signing action described in connection with step S2-1.

In step S2-4, the comparison verification means 40 verifies the thus-determined signature data by comparison with reference data. When a result of comparison shows that the signature data are similar to the reference data to such an extent that both data are determined to originate from one and the same person, an authentication result showing that "personal identification is authenticated" is output. In contrast, if the signature data are not similar to the reference data, another authentication result showing that "personal identification is not authenticated" is output The reference data are signature data registered in advance in the storage means 42 by the original user. The reference data are also signature data pertaining to a signing action performed in midair beforehand by the original user.

Time-series data pertaining to coordinates produced when the user has affixed a signature in midair are time-series data pertaining to coordinates of the pen tip, as in the case of signature data acquired by way of a related-art electronic tablet. A difference between those sets of time-series data lies only in the issue of whether the signature was affixed on the electronic tablet or in midair. Those data sets are similar to each other in terms of an intrinsic nature of a signature; that is, biometric data pertaining to an individual.

As mentioned above, the embodiment A-1 enables personal identification on the basis of signature data written in midair by the user.

Here, the coordinate computation means 22 and the comparison verification means 40 are preferably constituted of a computer; i.e., a combination of software and a processor for executing the software. In the case where high-speed authentication operation is especially required, the coordinate computation means and the comparison verification means are preferably constituted of hardware, such as a custom-designed LSI. Moreover, the coordinate computation means 22 is preferably constituted through use of a so-called video tracker.

The storage means 42 may be constituted of magnetic storage means, such as a hard disk drive, a flexible disk, or the like; or may be constituted of an optical disk, such as a CD-ROM, an MO, or the like. In addition, the storage means 42 may utilize semiconductor storage means, such as flash memory.

Embodiment A-2 (A Modification Employing a Different Method of Determining Start and End)

In the embodiment A-1, the coordinate computation means 22 determines the start time and end time of signing action from the activated or deactivated state of the pen device 30.

However, the start time and end time may be determined by means of another technique.

For example, in a case where the user has left the pen device 30 at rest in midair for a period of time longer than a predetermined period T1 and then started moving the pen device 30, a point in time when movement of the pen is started is determined to be a start time of signing action.

In this case, when a time longer than the predetermined period time T1 has elapsed since the pen device 30 become stationary, the coordinate computation means 22 preferably informs the user, by means of bell sounds, that a time longer than the period T1 has elapsed and that entry of a signature has become possible. Alternatively, voice output of a message stating that "Please start affixing a signature" or the like is also preferable. In addition, illumination of a predetermined light is also desirable. By means of these signals, the user can ascertain that a signing action can be started as a result of lapse of the period T1.

When the user has left the pen device 30 at rest in midair for a period of time longer than a predetermined period T2 when terminating the signing action, a point in time when the pen device has started remaining at rest is determined to be an end time of the signing action (i.e., a point in time when the signing action has been stopped).

In this case, when a period of time longer than the predetermined period T2 has elapsed since the pen device 30 was laid to rest, the coordinate computation means 22 preferably informs the user of lapse of time, by means of bell sounds. Alternatively, voice output of a message stating that "Acquisition of signature data has been completed" or the like is also preferable. In addition, illumination of a predetermined light is also desirable. By means of these signals, the user can ascertain that the signing action has been completed as a result of lapse of the period T2.

With regard to whether or not the pen device 30 remains at rest, the pen device is preferably determined to remain at rest when variations in the coordinates of the pen device 30 are lower than a predetermined level. When a person lays the pen device 30 to rest in midair, somewhat fluctuations are usually considered to arise. Therefore, if a strict definition of "stationary" is applied to a determination, the pen device is determined to be "moving" even when only slight changes have arisen in the coordinates of the pen device, thereby rendering the determination inappropriate.

Therefore, a very small level is prepared. If movement of the pen device is smaller than this level, the pen device is preferably determined to remain "at rest." Here, the word "movement" generally signifies variations in the coordinates of a pen across frames of an image.

Embodiment A-3 (A Modification of the Pen Device 30)

In the embodiment A-1, the user has performed the signing action in midair through use of the pen device 30 having the illumination means 32. The pen device 30 is illustrated in FIG. 3 as if assuming the same geometry as that of an ordinary pen. However, the pen device may assume any geometry, so long as the pen has the illumination means 32.

In the embodiment A-1 the pen device 30 is constructed as having the illumination means 32. However, the illumination means 32 may be omitted, so long as the pen device 30 can be distinguished from surroundings in an image. For instance, if the pen device 30 is given a very uncommon pattern or a coloration which is not in the environment, the pen tip can be distinguished on image data. In such a case, the illumination means 32 is not necessarily required.

When the illumination means 32 is not used, difficulty is encountered in representing the start and end of signing action in the form of an illuminated/extinguished state of the illumination means 32. For this reason, in a preferable configuration the start and end of a signing action are indicated by means of laying the pen device 30 to rest for a given period of time, as has been described in connection with the embodiment A-2. In another preferable configuration, the user indicates the start and end of a signing action through use of switching means provided separately on the personal identification apparatus 10.

Performing a signing action without use of the pen device 30 is also preferable. For example, if a highly-accurate image recognition technique is employed, a user's finger or the like can be identified in an image. In this case, when the user has a color or geometry easy to identify in an image, such as that of nail polish or a ring, the color of the nail polish or the geometry of the ring is preferably identified through image recognition, and coordinate data pertaining to movement of the finger are preferably detected, thereby determining signature data.

Embodiment A-4 (A Handwritten Data Input Apparatus)

The embodiments A-1 through A-3 have described the personal identification device and method using the handwritten data input means 12. The handwritten data input means 12 enables entry of various sets of handwritten data other than signature data, as does the related-art electronic tablet. Consequently, the handwritten data input means 12 is preferably used as a handwritten data input apparatus in place of a related-art electronic tablet, thereby constituting a device for inputting graphics or drawings.

Embodiment A-5 (A Guide Constituted of a Flat Plate)

The embodiments A-1 through A-4 have described a case where handwritten data and signature data are written in midair. However, if a flat plate guide is provided, the user can more easily write handwritten data.

Figure 5:
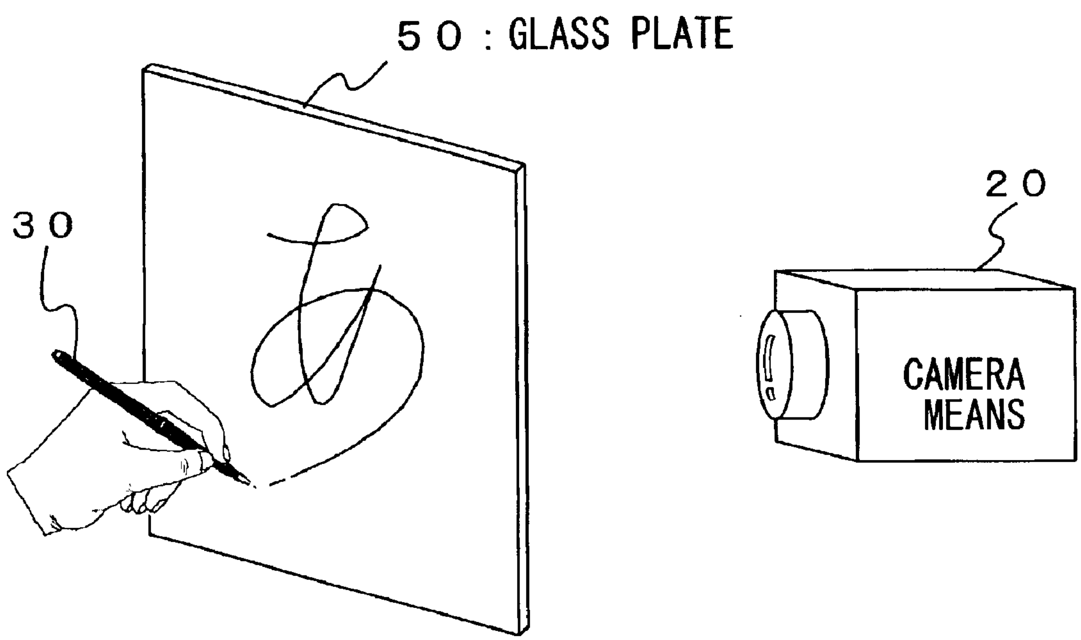
FIG. 5 is a descriptive view showing an example using a flat glass plate.

FIG. 5 shows such an example. As shown in the drawing, a flat glass plate 50 is transparent, and the user writes handwritten data on one surface of the flat glass plate 50. At this time, the user can support the pen device 30 by means of presence of the flat glass plate 50. Hence, there is yielded an effect of rendering writing of handwritten data more easy.

As shown in FIG. 5, the camera means 20 takes a photograph from the back of the flat glass plate 50. Use of the flat, transparent glass plate 50 enables such a photographing operation. Here, the word "back" refers to a surface opposite to the surface of the plate on which the user is writing handwritten data.

Although the flat glass plate 50 is employed, as a matter of course use of another material is possible, so long as the material forms a transparent flat plate.

Embodiment A-6 (A Finger or a Marker Placed on a Finger)

Although the embodiments A-1 through A-5 have used the pen device 30, use of a mere "finger" is also preferable. If the finger can be identified in image data, handwritten data can be obtained as time-series data pertaining to coordinates on the same principle as that described above.

Alternatively, a marker is preferably attached to a finger. The marker is easy to identify in an image. Consequently, there is yielded an effect of substantially facilitating determination of coordinates of the finger by means of determining coordinates of the marker.

Here, the marker is a general concept regarding means having the function of making a subject conspicuous by means of reflecting light, such as a reflection tape, as well as regarding various types of paints, fluorescent paints, or luminous paints of conspicuous colors. The marker is easy to distinguish from the environment in an image. Hence, coordinates of the marker can be readily determined.

Embodiment A-7 (Start Time and End Time)

Although there has been described a technique of acquiring handwritten data as time-series data pertaining to coordinates, in addition to the technique of making a determination on the basis of whether or not the pen device 30 is illuminated or extinguished, various other techniques of determining the start time and end time of handwritten data are conceivable.

For example, a determination is preferably made by means of user's voice or the sound of a pen switch. Further, the pen device 30 is preferably provided with a mechanism for issuing a predetermined sound, and preferably the start and end of handwritten data with the predetermined sound are explicitly indicated by means of the user activating the mechanism.

As mentioned above, when a determination is made as to a start time and an end time by means of sound (or voice), the coordinate computation means 22 is preferably constructed so as to be supplied with such sound data and to make a determination as to a start time and an end time on the basis of the sound data. The reason for this is that the coordinate computation means 22 must ascertain a start time and an end time.

Embodiment A-8 (Display of Handwritten Data)

Figure 6:
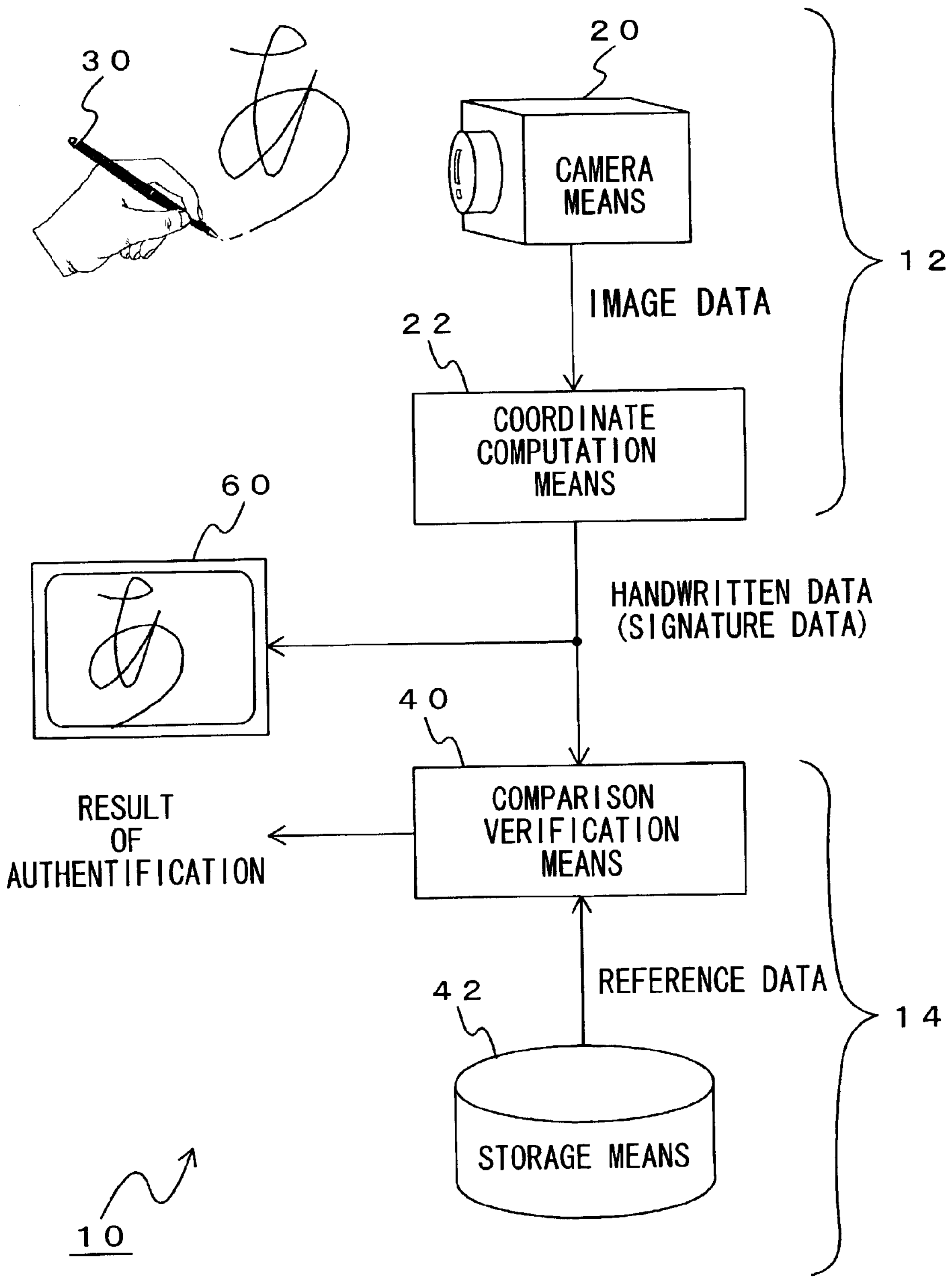
FIG. 6 is a descriptive view showing an example using display means.

Entry of handwritten data has been described thus far. If the user can ascertain the handwritten data input by himself/herself, convenience will be afforded to the user. FIG. 6 is a descriptive view showing the configuration of the personal identification apparatus 10 provided with display means 60 for displaying the input handwritten data. The display means 60 has the function of receiving time-series data pertaining to coordinates and displaying respective coordinates. The display means 60 can be embodied in the form of, e.g., a personal computer. A liquid-crystal display screen or CRT may be used for the display means.

Even if coordinates have been acquired at coarse time intervals, a smooth display is obtained by means of interconnecting respective coordinates in chronological order through use of line segments and displaying the line segments at the time of a display operation. Preferably, interconnection of respective coordinates is displayed not through use of mere line segments but in the form of a graphic interpolated by a curve such as a spline curve.

Simultaneous display of handwritten data and a handwriting operation; that is, real-time display of handwritten data, is generally preferable. A person tends to look at his/her hand while performing a writing operation. However, a user could conceivably encounter difficulty in viewing a display screen while performing a writing action. For this reason, conceivably many users desire to look at a display screen after having finished performing a handwriting action.

Display of handwritten data in the manner as mentioned above enables the user to ascertain the handwritten data entered by himself/herself, thus improving the user's convenience.

Embodiment A-9 (Utilization of Modulated Light)

The illumination means 32 of the pen device 30 is higher in brightness level than surroundings in an image. Hence, the pen device 30 can be readily distinguished from surroundings and recognized in an image.

Modulated light is preferably used as light which is to originate from the illumination means 32.

For instance, light originating from the light emission means 32 is blinked at a frequency of 100 Hz or thereabouts. If only the light that blinks at a frequency of 100 Hz is extracted from motion picture data through filtering, the position of the illumination means 32 can be clearly identified. As mentioned above, blinking the illumination means 32 at predetermined cycles yields an effect particularly when handwritten data or signature data are input in surroundings of high brightness level (e.g., outdoors in daylight, or a like situation). If surroundings have a high brightness level, difficulty is encountered in setting the brightness level of the light originating from the illumination means 32 so as to become higher than that of the surroundings. Hence, mere illumination of the illumination means 32 is also conceived to impose difficulty in identifying the pen device 30. However, since a light source which repeatedly blinks at a cycle of about 100 Hz is rarely found in the natural world, adoption of modulated light enables easy identification of the pen device 30.

In relation to a filtering technique for extracting only modulated light (which blinks at a cycle of, e.g., 100 Hz), various filtering techniques are available. Repeated blinking at a frequency of 100 Hz means, simply, that illuminating the light source for five milliseconds and extinguishing it for subsequent five milliseconds are repeated. If motion picture data corresponding to a period of five milliseconds during which the light source is extinguished are extracted from motion picture data corresponding to a period of five milliseconds during which the light source is illuminated, the absolute value of brightness level of the blinking illumination means 32 is substantially doubled. In contrast, in relation to the surroundings whose brightness level remains substantially unchanged, essentially an identical value is subtracted from the motion picture data for illumination and from the motion picture data for extinction. Hence, the value of image data pertaining to the surroundings approaches zero, whereas the absolute value of image data pertaining to an area corresponding to the illumination means 32 is substantially doubled. If an area having a large absolute value is extracted from an image after the image data have been subjected to such processing, the area of the illumination means 32 can be extracted readily.

In the embodiment A-9, the coordinate computation means 22 performs the above-described filtering operation. The coordinate computation means 22 computes coordinates of the extracted area of the illumination means 32.

In this way, according to the embodiment A-9, modulated light is used for the light which is to originate from the illumination means 32. Even when surroundings have a high brightness level, the illumination means 32 can be distinguished in an image. Consequently, the position of the pen device 30 can be ascertained even in a bright location, and hence the user can enter handwritten data and signature data even when outdoors in daylight.

A second group of preferred embodiments of the invention will be described hereinbelow by reference to the drawings.

Embodiment B-1

Figure 7:
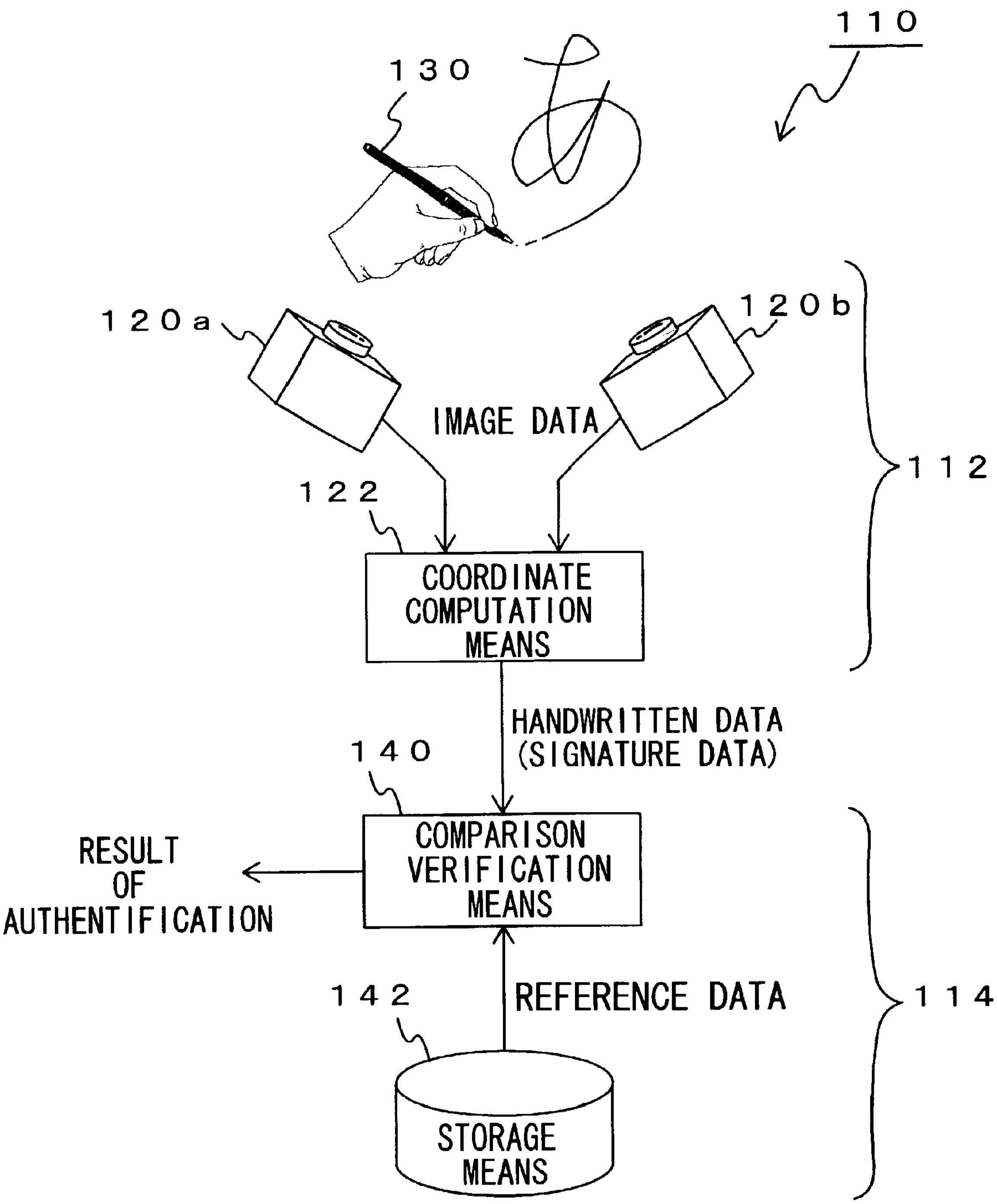
FIG. 7 is a block diagram showing the configuration of a personal identification apparatus according to a preferred embodiment B-1 of the invention.

FIG. 7 is a block diagram showing the configuration of a personal identification apparatus 110 according to a preferred embodiment of the invention. As illustrated, the personal identification apparatus 110 comprises handwritten data input means 112 for enabling entry of signature data which are handwritten data pertaining to a user; and signature matching means 114 which verifies the handwritten data against previously-recorded signature data through comparison, to thereby determine whether or not personal identification is authenticated.

The handwritten data input means 112 comprises first camera means 120*a*, second camera means 120*b*, and coordinate computation means 122.

The first camera means 120*a* photographs an image of a pen device 130 to be moved in midair (hereinafter also called "three-dimensional space") by a user and outputs first image data in the form of motion pictures. The second camera means 120*b* photographs, from a different angle, an image of the pen device 130 to be moved in midair by the user and outputs second image data in the form of motion pictures.

The coordinate computation means 122 computes time-series data pertaining to coordinates of the pen tip of the pen device 130 from these sets of image data.

In the embodiment B-1, the coordinates are three-dimensional coordinates in three-dimensional space. Time-series data pertaining to the three-dimensional coordinates three-dimensionally represent handwritten data written in midair (i.e., in three-dimensional space) by the user through use of the pen device 130.

In the embodiment B-1, user's handwritten data can be input as three-dimensional coordinate data.

When the user has written a signature in midair, the handwritten data can be utilized as signature data which are to become an object of personal identification. Particularly in this case, the signature data are three-dimensional data, and hence there can be realized personal identification which is higher in accuracy than that obtained from two-dimensional data.

The signature matching means 114 has comparison verification means 140 and storage means 142.

The comparison verification means 140 verifies the handwritten data (signature data) output from the coordinate computation means 122 by means of comparison with reference data previously stored in the storage means 142. If the result of comparison shows that the handwritten data are similar to the reference data to such an extent that the handwritten data can be determined to be affixed by the same person, an authentication result showing "Identification is authenticated" is output. Here, the expression "reference data" means signature data previously registered by the original user.

Figure 8:
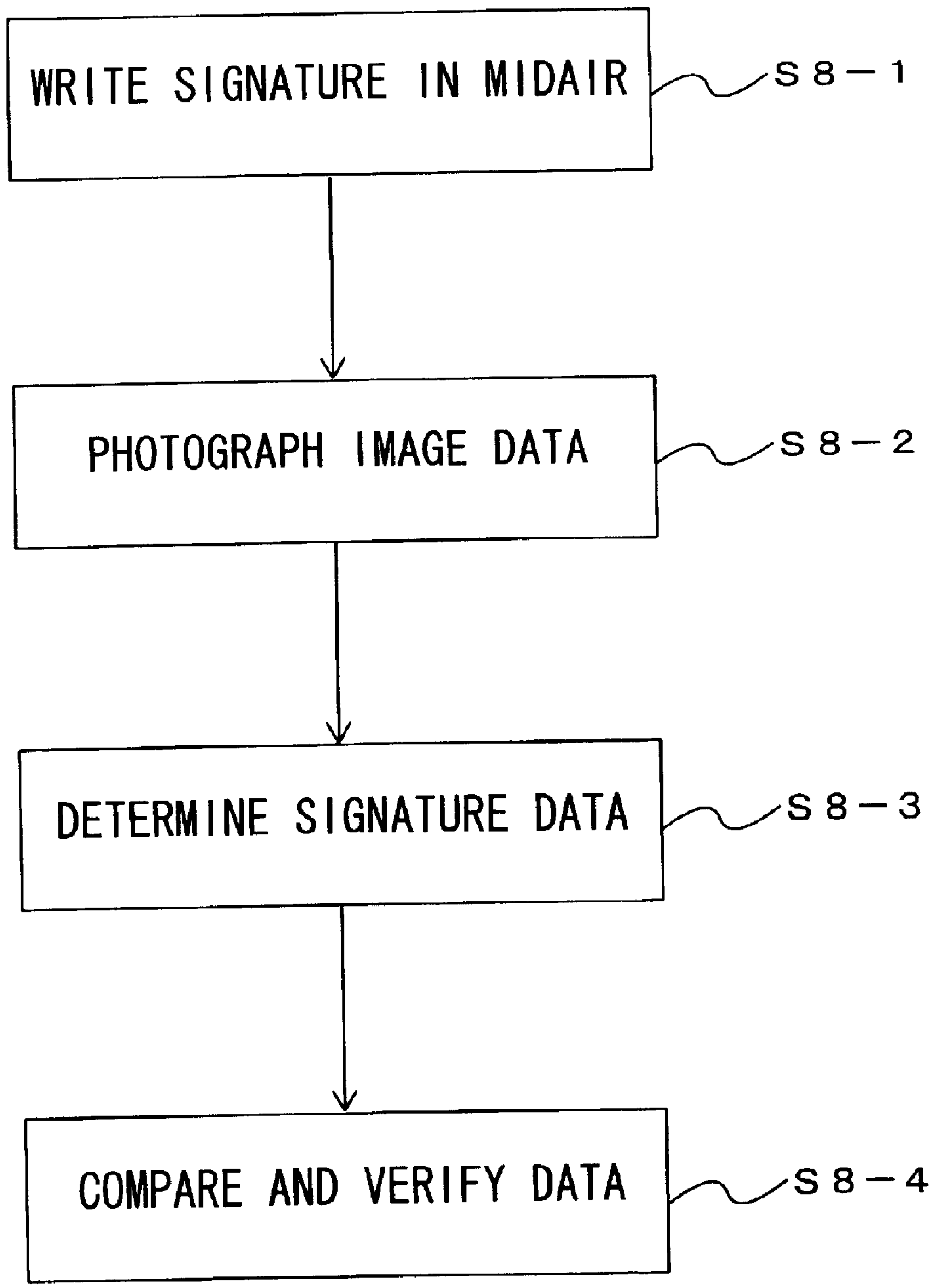
FIG. 8 is a flowchart showing the flow of an operation of a personal identification method according to the embodiment B-1.

Detailed personal identification operation of the personal identification apparatus 110; that is, an operation of the personal identification method, will now be described by reference to a flowchart shown in FIG. 8.

Figure 9:
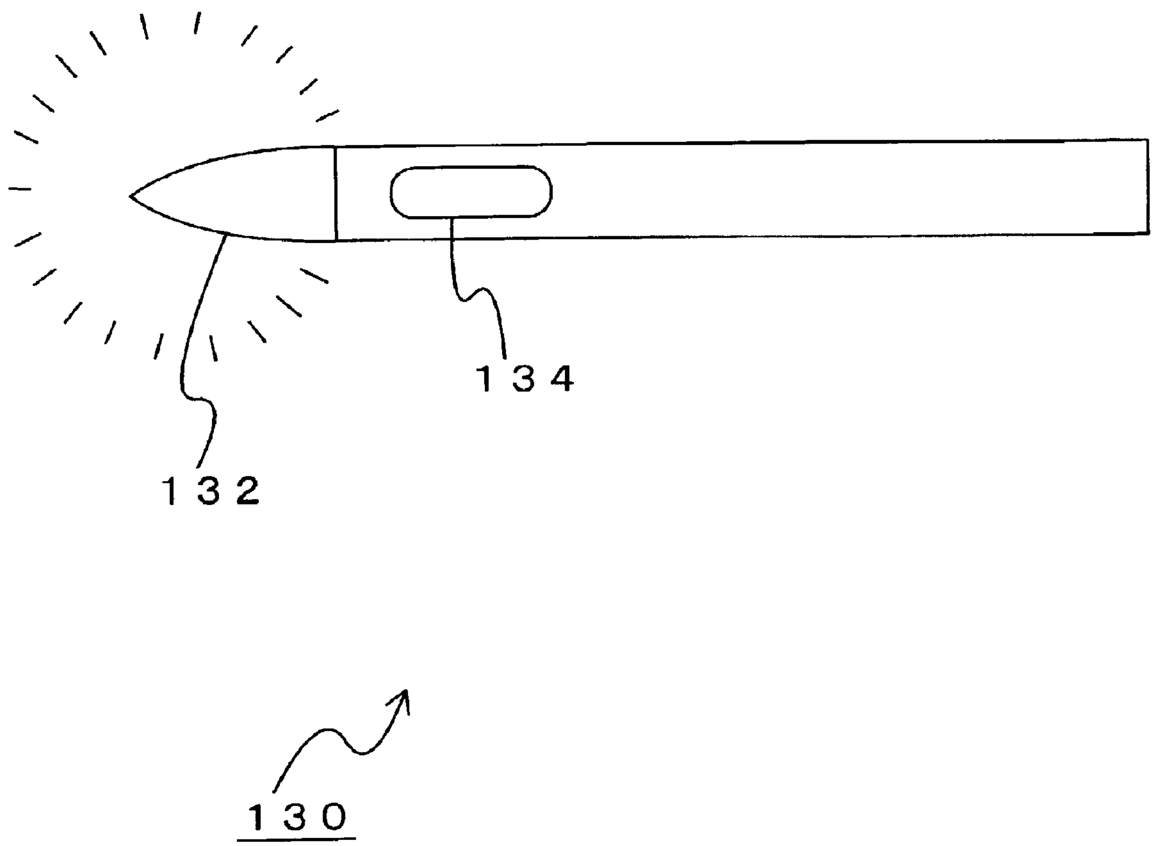
FIG. 9 is a descriptive view of a pen device.

In step S8-1, the user affixes a signature by means of moving the pen device 130 in midair. FIG. 9 is a descriptive view of the pen device 130. As illustrated, illumination means 132 is provided at the tip end of the pen device 130. The illumination means 132 has an LED (light-emitting diode) and a lamp and can emit light.

The pen device 130 has a button switch 134. The user can activate or deactivate the illumination means 132 by means of actuating the button switch 134 with a finger.

First, the user activates the illumination means 132 by use of the button switch 134, thereby indicating commencement of a signing action. The user performs a signing action while the illumination means 132 remains illuminated. At a point in time when the signing action has been completed, the user actuates the button switch 134, thereby deactivating the illumination means 132. The deactivating operation enables indication of the end of the signing action.

The pen device 30 having the illumination means 32 is utilized in the embodiment B-1 for two reasons: (1) for explicitly pointing out the start and end of signing action in the manner as mentioned previously; and (2) for facilitating detection of coordinates of the pen device 130 (particularly the pen tip thereof). These actions will be discussed in detail later.

In step S8-2, the first camera means 120*a* photographs the pen device 130 and outputs resultant image data (first image data). The camera means 120 corresponds to a video camera. The first image data to be output are motion picture data of 120 frames/sec or thereabouts (hereinafter often referred to also as "first motion picture data"). In this way, instep S8-3 motion picture data are acquired.

In the embodiment B-1, acquisition of handwritten data is performed by use of the second camera means 120*b*, as well as by use of the first camera 120*a*. More specifically, the second camera means 120*b* photographs the pen device 130 from an angle different from that in which the first camera means 120*a* photographs and outputs image data (second image data). The second image data are also motion picture data of about 120 frames/sec (hereinafter often referred to also as "second motion picture data"). In this way, in step S8-3 motion picture data are acquired from two different angles.

A common video camera which outputs motion picture data of 15 to 30 frames/sec or thereabouts can also be utilized, although accuracy of personal identification is lowered slightly.

In step S8-3, the coordinate computation means 122 determines coordinates of the pen means 130 in three-dimensional space; that is, determines three-dimensional coordinates, on the basis of the sets of image data (the first and second sets of motion picture data). Further, time-series data pertaining to coordinates; i.e., signature data, are determined by means of sequential computation of the three-dimensional coordinates.

At this time, the coordinate computation means 122 seeks coordinates of a portion of the image data having a high brightness level. Specifically speaking, an area of the image data whose brightness level is greater than or equal to than a predetermined threshold level $\alpha$ is extracted, and the centroid of brightness of the area is determined. The position of the centroid is deemed as the pen tip, and coordinates of the pen tip are determined. Every portion of the pen device 130 may be used for determining the position of the centroid. A traditional signature involving an action of affixing a signature on paper with a pen is performed through use of a pen "tip," and hence determination of coordinates of the "pen tip" is considered to be desirable in terms of providing a familiar situation.

In this way, in the embodiment B-1, the position of the pen device 130 can be readily determined from image data by use of the pen device 130 having the illumination means 132.

The position of the pen device 130 can be determined three-dimensionally by use of the first and second motion picture data acquired from different angles. More specifically, three-dimensional coordinates of the pen device 130 can be determined.

Figure 10:
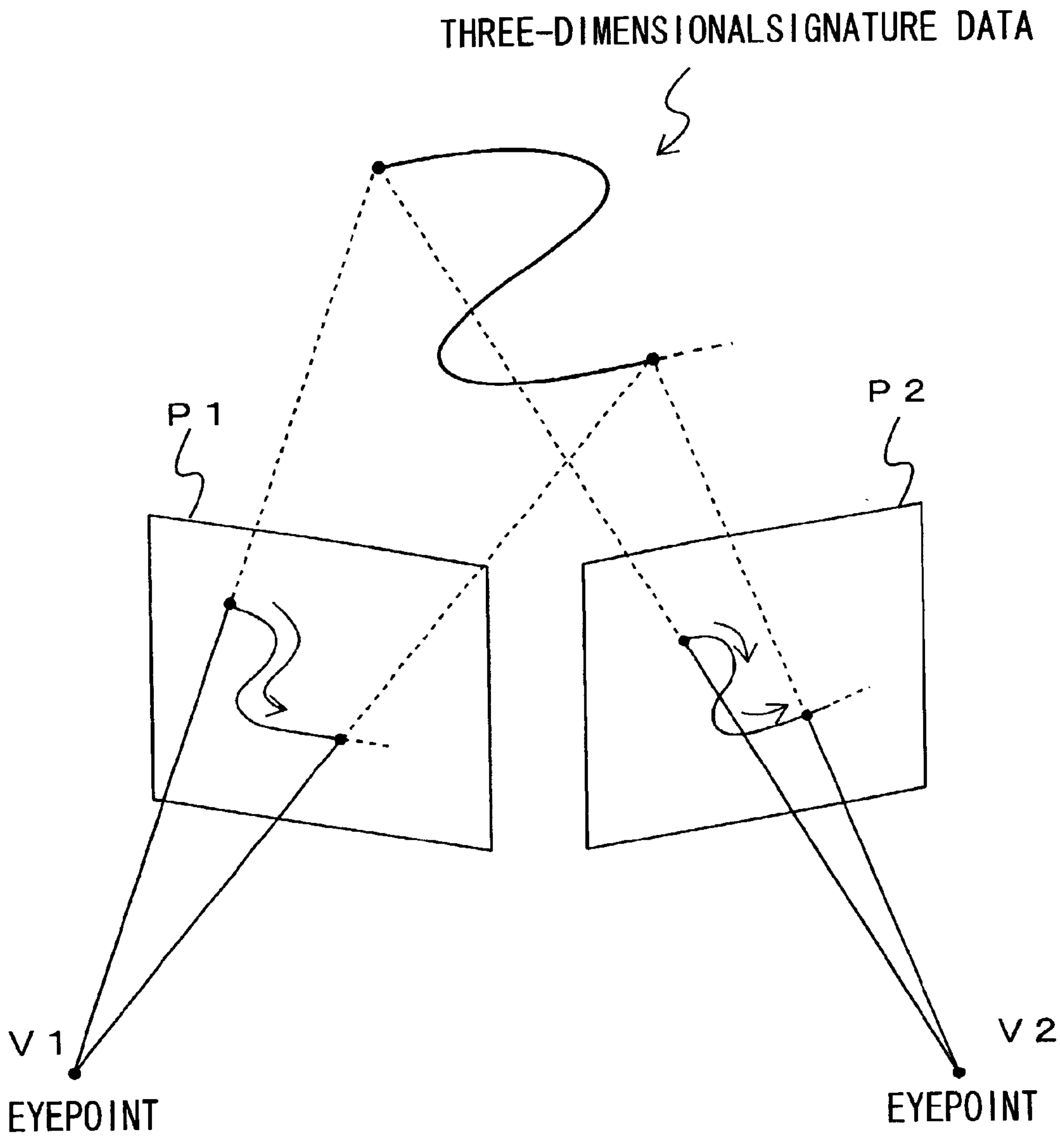
FIG. 10 is a descriptive view showing the principle to be used for determining three-dimensional coordinates.

FIG. 10 is a descriptive view showing a principle to be used for determining three-dimensional coordinates.

In the illustration, a plane perpendicular to the angle from which the first motion picture data have been photographed is represented by P1, and a plane perpendicular to the angle from which the second motion picture data have been photographed is represented by P2. An eyepoint V1 is set for the plane P1, and an eyepoint V2 is set for the plane P2. A line of sight is extended from the eyepoint V1 to the position of the pen device on the resultant image, and another line of sight is extended from the eyepoint V2 to the position of the pen device on another resultant image. Coordinates of an intersection of these lines of sight are computed, and the thus-computed coordinates are taken as coordinates of the pen device 130.

Since the thus-photographed image data are motion picture data, the position of the pen device 130 on the image changes momentarily. Time-series data pertaining to coordinates of the pen device 130 are determined by means of sequentially determining coordinates of the pen device 130 so as to follow the variations.

In this way, signature data pertaining to the user can be obtained as three-dimensional time-series data.

The coordinate computation means 122 determines a start time and a finish time of signature data corresponding to time-series data, as follows.

First, a point in time when an area having a predetermined threshold brightness level $\alpha$ or higher has appeared in image data is determined to be a point in time when the user has started a signing action, and time-series data originating from that point in time are taken as signature data.

A point in time when the area having a predetermined threshold brightness level $\alpha$ or higher has disappeared from the image data is determined to be a point in time when the user has completed the signing action, and the time-series data that have been generated up to that point in time are taken as signature data.

Since the coordinate computation means 122 performs such an operation, this means can readily determine the start and end of signature data in accordance with the user's signing action described in connection with step S8-1. In other words, when the user illuminates the illumination means 132 of the pen device 130 by means of actuating the button switch 134, the coordinate computation means 122 detects the illumination operation and determines that a signing action has been started. When the user extinguishes the illumination means 132 of the pen device 130 by means of actuating the button switch 134, the coordinate computation means 122 detects the extinction operation and determines that the signing operation has been completed.

In step S8-4, the comparison verification means 140 verifies the thus-determined signature data by comparison with reference data. When a result of comparison shows that the signature data are similar to the reference data to such an extent that both data are determined to originate from the same person, an authentication result showing that "identification is authenticated" is output. In contrast, if the signature data are not similar to the reference data, another authentication result showing that "Identification is not authenticated" is output. The reference data are signature data registered in advance in the storage means 142 by the original user. The reference data are also signature data pertaining to a signing action performed in midair beforehand by the original user.

Time-series data pertaining to coordinates produced when the user has affixed a signature in midair are time-series data pertaining to three-dimensional coordinates in midair. Consequently, the time-series data are three-dimensional data, as in the case of signature data including a writing pressure acquired by way of a related-art electronic tablet to be used for detecting a writing pressure. Therefore, accuracy similar to that obtained in the related art is considered to be achieved when three-dimensional data are utilized for signature matching.

As mentioned above, the embodiment B-1 enables personal identification on the basis of signature data written in midair by the user.

Here, the coordinate computation means 122 and the comparison verification means 140 are preferably constituted of a computer; i.e., a combination of software and a processor for executing the software. In the case where high-speed authentication operation is especially required, the coordinate computation means and the computation verification means are preferably constituted of hardware, such as a custom-designed LSI. Moreover, the coordinate computation means 122 is preferably constituted through use of a so-called video tracker.

The storage means 142 may be constituted of magnetic storage means, such as a hard disk drive, a flexible disk, or the like; or may be constituted of an optical disk, such as a CD-ROM, an MO, or the like. In addition, the storage means 142 may utilize semiconductor storage means, such as flash memory.

Embodiment B-2 (A Modification Employing a Different Method of Determining Start and End)

In the embodiment B-1, the coordinate computation means 122 determines the start time and end time of signing action from the activated or deactivated state of the pen device 130.

However, the start time and end time may be determined by means of another technique.

For example, in a case where the user has left the pen device 130 at rest in midair for a period of time longer than a predetermined period T1 and then started moving the pen device 130, a point in time when movement of the pen is started is determined to be a start time of signing action.

In this case, when a time longer than the predetermined period time T1 has elapsed since the pen device 130 has become stationary, the coordinate computation means 122 preferably informs the user, by means of bell sounds, that a time longer than the period T1 has elapsed and that entry of a signature has become possible. Alternatively, voice output of a message stating "Please start affixing a signature" or the like is also preferable. In addition, illumination of a predetermined light is also desirable. By means of these signals, the user can ascertain that a signing action can be started as a result of lapse of the period T1.

When the user has left the pen device 130 at rest in midair for a period of time longer than a predetermined period T2 when terminating the signing action, a point in time when the pen device has started remaining at rest is determined to be an end time of the signing action (i.e., a point in time when the signing action has been stopped).

In this case, when a period of time longer than the predetermined period T2 has elapsed since the pen device 130 has been laid to rest, the coordinate computation means 122 preferably informs the user of lapse of time, by means of bell sounds. Alternatively, voice output of a message stating that "Acquisition of signature data has been completed" or the like is also preferable. In addition, illumination of a predetermined light is also desirable. By means of these signals, the user can ascertain that the signing action has been completed as a result of lapse of the period T2.

With regard to whether or not the pen device 130 remains at rest, the pen device is preferably determined to remain at rest when variations in the coordinates of the pen device 130 are lower than a predetermined level. When a person lays the pen device 130 to rest in midair, some fluctuations are usually considered to arise. Therefore, if a strict definition of "stationary" is applied to a determination, the pen device is determined to be "moving" even when only slight changes have arisen in the coordinates of the pen device, thereby rendering the determination inappropriate.

Therefore, a very small level is prepared. If movement of the pen device is smaller than this level, the pen device is preferably determined to remain "at rest." Here, the word "movement" generally signifies variations in the coordinates of a pen across frames of an image.

Embodiment B-3 (A Modification of the Pen Device 130)

In the embodiment B-1, the user has performed the signing action in midair through use of the pen device 130 having the illumination means 132. The pen device 130 is illustrated in FIG. 9 as if assuming the same geometry as that of an ordinary pen. However, the pen device may assume any geometry, so long as the pen has the illumination means 132.

In the embodiment B-1, the pen device 130 is constructed as having the illumination means 132. However, the illumination means 132 may be omitted, so long as the pen device 130 can be distinguished from surroundings in an image. For instance, if the pen device 130 is given a very uncommon pattern or a coloration which is not in the environment, the pen tip can be distinguished on image data. In such a case, the illumination means 132 is not necessarily required.

When the illumination means 132 is not used, difficulty is encountered in representing the start and end of signing action in the form of an illuminated/extinguished state of the illumination means 132. For this reason, in a preferable configuration the start and end of a signing action are indicated by means of laying the pen device 130 to rest for a given period of time, as has been described in connection with the embodiment B-2. In another preferable configuration, the user indicates the start and end of a signing action through use of switching means provided separately on the personal identification apparatus 110.

Performing a signing action without use of the pen device 130 is also preferable. For example, if a highly-accurate image recognition technique is employed, a user's finger or the like can be identified in an image. In this case, when the user has a color or geometry easy to identify in an image, such as that of nail polish or a ring, the color of the nail polish or the geometry of the ring is preferably identified through image recognition, and coordinate data pertaining to movement of the finger are preferably detected, thereby determining signature data.

Embodiment B-4 (A Handwritten Data Input Apparatus)

The embodiments B-1 through B-3 have described the personal identification device and method using the handwritten data input means 112. The handwritten data input means 112 enables entry of various sets of handwritten data other than signature data, as does the related-art electronic tablet. Consequently, the handwritten data input means 112 is preferably used as a handwritten data input apparatus in place of a related-art electronic tablet, thereby constituting a device for inputting graphics or drawings.

Embodiment B-5 (A Finger or a Marker Placed on a Finger)

Although the embodiments B-1 through B-4 have used the pen device 130, use of a mere "finger" is also preferable. If the finger can be identified in image data, handwritten data can be obtained as time-series data pertaining to coordinates on the same principle as that described above.

Alternatively, a marker is preferably attached to a finger. The marker is easy to identify in an image. Consequently, there is yielded an effect of substantially facilitating determination of coordinates of the finger by means of determining coordinates of the marker.

Here, the marker is a general concept regarding means having the function of making a subject conspicuous by means of reflecting light, such as a reflection tape, as well as regarding various types of paints, fluorescent paints, or luminous paints of conspicuous colors. The marker is easily distinguished from the environment in an image. Hence, coordinates of the marker can be readily determined.

Embodiment B-6 (Start Time and End Time)

Although there has been described a technique of acquiring handwritten data as time-series data pertaining to coordinates, in addition to the technique of making a determination on the basis of whether or not the pen device 130 is illuminated or extinguished, various other techniques of determining the start time and end time of handwritten data are conceivable.

For example, a determination is preferably made by means of user's voice or the sound of a pen switch. Further, the pen device 130 is preferably provided with a mechanism for issuing a predetermined sound, and preferably the start and end of handwritten data with the predetermined sound are explicitly indicated by means of the user activating the mechanism.

As mentioned above, when a determination is made as to a start time and an end time by means of sound (or voice), the coordinate computation means 122 is preferably constructed so as to be supplied with such sound data and to make a determination as to a start time and an end time on the basis of the sound data. The reason for this is that the coordinate computation means 122 must ascertain a start time and an end time.

Embodiment B-7 (Display of Handwritten Data)

Figure 11:
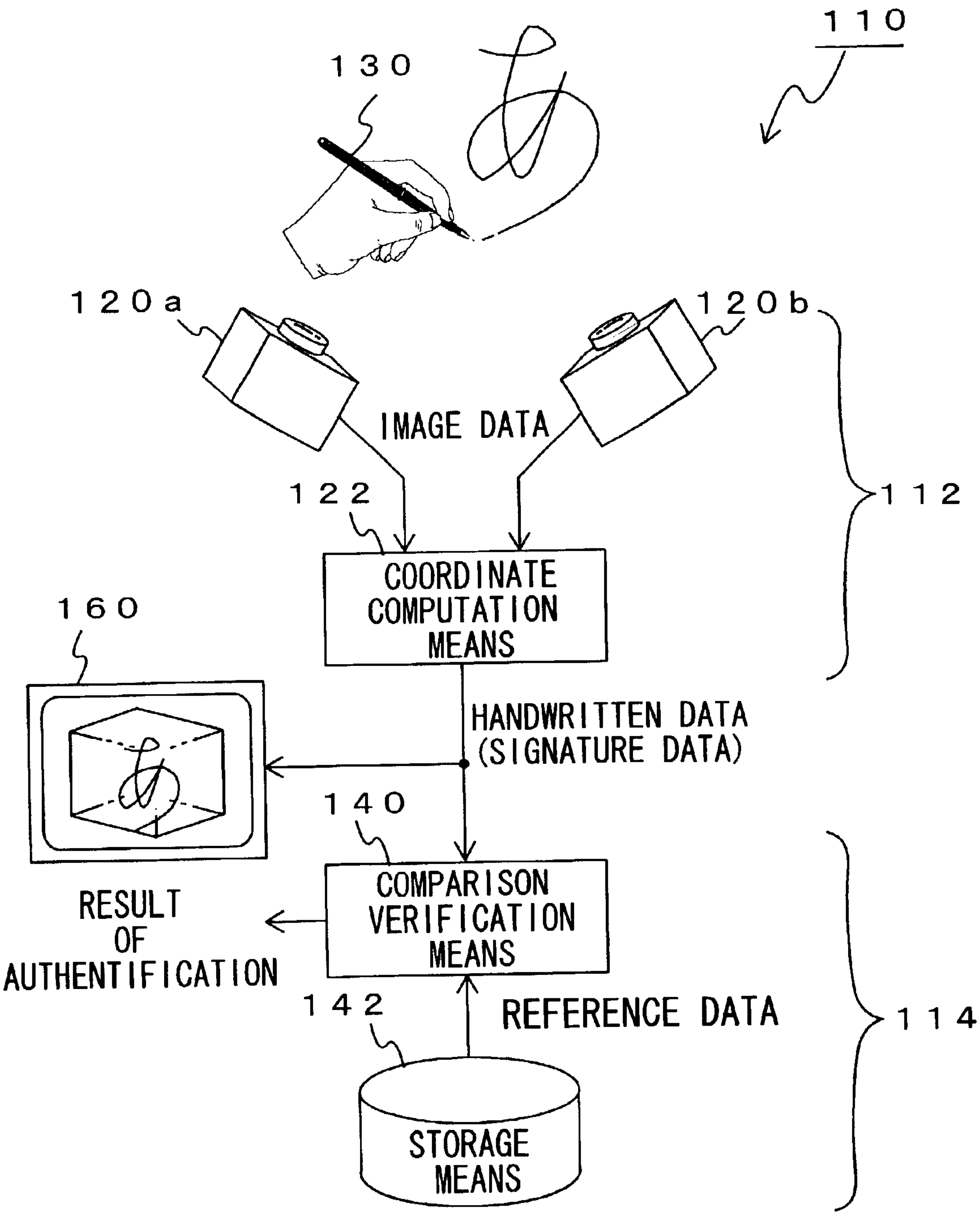
FIG. 11 is a descriptive view showing an example using display means.

Entry of handwritten data has been described thus far. If the user can ascertain the handwritten data input by himself/herself, convenience will be afforded to the user. FIG. 11 is a descriptive view showing the configuration of the personal identification apparatus 110 provided with display means 160 for displaying the input handwritten data. The display means 160 has the function of receiving time-series data pertaining to coordinates and displaying respective coordinates.

More accurately, the display is a projection drawing (two-dimensional display) which is produced by means of projecting three-dimensional coordinates on a two-dimensional plane. In the display, an eyepoint can be preferably moved in accordance with a user's choice, or an object can be preferably rotated.

The display means 160 can be embodied in the form of, e.g., a personal computer. A liquid-crystal display screen or CRT may be used for the display means.

Even if coordinates have been acquired at coarse time intervals, a smooth display will be obtained by means of interconnecting respective coordinates in chronological order through use of line segments and displaying the line segments at the time of a display operation. Preferably, interconnection of respective coordinates is displayed not through use of mere line segments but in the form of a graphic interpolated by a curve such as a spline curve.

Simultaneous display of handwritten data and a handwriting operation; that is, real-time display of handwritten data, is generally preferable. However, displaying the entirety of handwritten data after completion of handwriting action is also preferable.

Display of handwritten data in the manner as mentioned above enables the user to ascertain the handwritten data entered by himself/herself, thus enhancing the user's convenience.

Embodiment B-8 (Utilization of Modulated Light)

The illumination means 132 of the pen device 130 is higher in brightness level than surroundings in an image. Hence, the pen device 130 can be readily distinguished from surroundings and recognized in an image.

Modulated light is preferably used as light which is to originate from the illumination means 132.

For instance, light originating from the light emission means 132 is blinked at a frequency of 100 Hz or thereabouts. If only the light that blinks at a frequency of 100 Hz is extracted from motion picture data through filtering, the position of the illumination means 132 can be clearly identified. As mentioned above, blinking the illumination means 132 at predetermined cycles yields an effect particularly when handwritten data or signature data are input in surroundings of high brightness level (e.g., outdoors in daylight, or a like situation). If surroundings have a high brightness level, difficulty is encountered in setting the brightness level of the light originating from the illumination means 132 so as to become higher than that of the surroundings. Hence, mere illumination of the illumination means 132 is also conceived to impose difficulty in identifying the pen device 130. However, since a light source which repeatedly blinks at a cycle of about 100 Hz is rarely present in the natural world, adoption of modulated light enables easy identification of the pen device 130.

In relation to a filtering technique for extracting only modulated light (which blinks at a cycle of, e.g., 100 Hz), various filtering techniques are available. Repeated blinking at a frequency of 100 Hz means simply that illuminating the light source for five milliseconds and extinguishing it for subsequent five milliseconds are repeated. If motion picture data corresponding to a period of five milliseconds during which the light source is extinguished are extracted from motion picture data corresponding to a period of five milliseconds during which the light source is illuminated, the absolute value of brightness level of the blinking illumination means 132 is substantially doubled. In contrast, in relation to the surroundings whose brightness level remains substantially unchanged, essentially an identical value is subtracted from the motion picture data for illumination and from the motion picture data for extinction. Hence, the value of image data pertaining to the surroundings approaches zero, whereas the absolute value of image data pertaining to an area corresponding to the illumination means 132 is substantially doubled. If an area having a large absolute value is extracted from an image after the image data have been subjected such processing, the area of the illumination means 132 can be extracted readily.

In the embodiment B-8, the coordinate computation means 122 performs the above-described filtering operation. The coordinate computation means 122 computes coordinates of the extracted area of the illumination means 132.

In this way, according to the embodiment B-8, modulated light is used for the light which is to originate from the illumination means 132. Even when surroundings have a high brightness level, the illumination means 132 can be distinguished in an image. Consequently, the position of the pen device 130 can be ascertained even in a bright location, and hence the user can enter handwritten data and signature data even outdoors in daylight.

As mentioned above, according to the first group of embodiments of the invention, the handwritten data written in midair by the user can be input. Hence, the handwritten data input apparatus can be miniaturized as compared with a case where an electronic tablet requiring a certain area is used. Consequently, even a compact electronic device, such as a portable cellular phone, can be provided with a handwritten data input function.

If the pen device is equipped with illumination means, coordinates of a pen tip become easy to detect, thus improving the accuracy of input of handwritten data.

If signature data to be used for personal identification are input by use of such a handwritten data input apparatus, personal identification can be carried out by means of a compact electronic device.

Since the start time and end time of signature data are represented by the illuminated/extinguished state of the illumination means, a determination can be readily made as to the start or end of acquisition of signature data.

If the start and end of input of handwritten data are determined by means of detecting a state in which the pen device remains at rest for a given period of time or more, provision of illumination means is obviated. In this case, the user can readily ascertain a start time/end time by means of being informed of a determination result with use of sounds at a point in time when the start or end has been determined.

If the personal identification device/method is configured by utilization of the handwritten data input apparatus/method, a personal identification device/method which yields a similar effect can be constructed.

If the handwritten data input apparatus is constructed such that handwritten data are written along a predetermined flat plate, a handwriting operation can be performed smoothly.

Since the invention is constructed such that the start time/end time of handwritten data is instructed by means of the user's voice or the sound of a pen switch, the user can explicitly show the start time/end time, thereby enabling smooth entry of handwritten data or signing action.

Since there is provided means for displaying input handwritten data, the user can check the handwritten data written by himself/herself. Therefore, safe entry of handwritten data is possible.

The invention is constructed such that handwritten data are written by use of a user's finger without use of a pen device, thereby obviating a necessity for preparing a pen device. Particularly, if a finger is provided with a marker, coordinates of the finger can be determined readily by means of determining coordinates of the marker.

The invention utilizes modulated light, thereby enabling easy identification of the light originating from the pen device. Consequently, even when surroundings are bright, entry of handwritten data and signature data can be effected.

As has bee described, according to the second group of embodiments of the invention, the handwritten data written in midair by the user can be input as time-series data pertaining to three-dimensional coordinates.

Particularly, according to the invention, since handwritten data are represented by three-dimensional coordinates in midair, the accuracy of signature verification can be improved.

By means of providing the pen device with the illumination means, coordinates of the pen device become easy to detect, thus improving the accuracy of input of handwritten data.

So long as signature data to be utilized for personal identification are input by use of such a handwritten data input apparatus, personal identification can be performed by means of a compact electronic device.

Since the start time and end time of signature data are represented by an illuminated/extinguished state of the illumination means, a determination can be readily made as to the start/end of acquisition of signature data.

If the start and end of input of handwritten data are determined by means of detecting a state in which the pen device remains at rest for a given period of time or more, there is obviated a necessity for providing the pen device with illumination means. Particularly in this case, the user can readily ascertain a start time/end time by means of being informed of a determination result by use of sounds at a point in time when the start or end has been determined.

If the personal identification device/method is configured by utilization of the handwritten data input apparatus/method, a personal identification device/method which yields a similar effect can be constructed.

Since the invention is constructed such that the start time/end time of handwritten data is instructed by means of the user's voice or the sound of a pen switch, the user can explicitly show the start time/end time, thereby enabling smooth entry of handwritten data or signing action.

Since there is provided means for displaying input handwritten data, the user can check the handwritten data written by himself/herself. Therefore, safe entry of handwritten data is possible.

The invention is constructed such that handwritten data are written by use of a user's finger without use of a pen device, thereby obviating a necessity for preparing a pen device. Particularly, if a finger is provided with a marker, coordinates of the finger can be determined readily by means of determining coordinates of the marker.

The invention utilizes modulated light, thereby enabling easy identification of light originating from the pen device. Consequently, even when surroundings are bright, entry of handwritten data and signature data can be effected.

What is claimed is:

1. A handwritten data input apparatus which acquires handwritten data written in midair by means of a user moving a pen device in midair, the apparatus comprising:

camera means for acquiring motion picture data pertaining to a pen device moved by the user; and coordinate computation means which determines time-series data pertaining to coordinates of a pen tip on a screen of the motion picture data, on the basis of motion picture data pertaining to the pen device acquired by the camera means, wherein the coordinate computation means computes coordinates of the pen device on the screen from a start time in which the pen device has started moving on the screen from a stationary state longer than a predetermined first period until a stop time in which the pen device stops moving as a result of having entered a stationary state longer than a predetermined second period.

2. The handwritten data input apparatus according to claim 1, wherein the coordinate computation means determines the pen device to be at rest when a change in coordinates of the pen device is smaller than a predetermined level.

3. The handwritten data input apparatus according to claim 1, wherein the coordinate computation means informs the user of commencement of input of handwritten data when the pen device is determined to be at rest for a period longer than the first period and informs the user of termination of input of handwritten data when the pen device is determined to be at rest for a period longer than the second period.

4. The handwritten data input apparatus according to claim 3, wherein the coordinate computation means informs the user of commencement of input of handwritten data by means of sound or informs termination of input of handwritten data by means of sound.

5. A handwritten data input apparatus which acquires handwritten data written in midair by means of a user moving a pen device in midair, the apparatus comprising:

camera means for acquiring motion picture data pertaining to a pen device moved by the user; and coordinate computation means which determines time-series data pertaining to coordinates of a pen tip on a screen of the motion picture data, on the basis of motion picture data pertaining to the pen device acquired by the camera means, wherein the coordinate computation means recognizes a start time and end time of computation of handwritten data by means of external sounds.

6. The handwritten data input apparatus according to claim 5, wherein the sounds are the voice of the user or sounds of a pen switch provided on the pen device.

7. A handwritten data input method by which handwritten data written in midair are acquired by means of a user moving a pen device in midair, the method comprising:

an acquisition step of acquiring motion picture data pertaining to a pen device moved by the user; and a coordinate computation step of determining time-series data pertaining to coordinates of a pen tip on a screen of the motion picture data, on the basis of the acquired motion picture data pertaining to the pen device, wherein there are computed, in the coordinate computation step, coordinates of the pen device on the screen from a start time in which the pen device has started moving on the screen from a stationary state longer than a predetermined first period until a stop time in which the pen device stops moving as a result of having entered a stationary state longer than a predetermined second period.

8. The handwritten data input method according to claim 7, wherein, in the coordinate computation step, the pen device is determined to be at rest when a change in coordinates of the pen device is smaller than a predetermined level.

9. The handwritten data input method according to claim 7, wherein, in the coordinate computation step, the user is informed of commencement of input of handwritten data when the pen device is determined to be at rest for a period longer than the first period and is informed of termination of input of handwritten data when the pen device is determined to be at rest for a period longer than the second period.

10. The handwritten data input method according to claim 9, wherein, in the coordinate computation step, the user is informed of commencement of input of handwritten data by means of sound or informs termination of input of handwritten data by means of sound.

11. A handwritten data input method by which handwritten data written in midair are acquired by means of a user moving a pen device in midair, the method comprising:

an acquisition step of acquiring motion picture data pertaining to a pen device moved by the user; and a coordinate computation step of determining time-series data pertaining to coordinates of a pen tip on a screen of the motion picture data, on the basis of the acquired motion picture data pertaining to the pen device, wherein, in the coordinate computation step, a start time and end time of computation of handwritten data are recognized by means of external sounds.

12. The handwritten data input method according to claim 11, wherein the sounds are the voice of the user or sounds of a pen switch provided on the pen device.

13. A handwritten data input apparatus which acquires handwritten data written in midair by means of a user moving a pen device in midair, the apparatus comprising:

first camera means for acquiring first motion picture data pertaining to the pen device moved by the user;

second camera means for acquiring second motion picture data pertaining to the pen device from an angle different from that of the first camera means; and coordinate computation means for determining three-dimensional coordinates of the pen device in three-dimensional space on the basis of the sets of first and second motion picture data and determining time-series data pertaining to the coordinates, wherein the coordinate computation means computes coordinates of the pen device on the screen from a start time in which the pen device has started moving on the screen from a stationary state longer than a predetermined first period until a stop time in which the pen device stops moving as a result of having entered a stationary state longer than a predetermined second period.

14. The handwritten data input apparatus according to claim 13, wherein the coordinate computation means determines the pen device to be at rest when a change in coordinates of the pen device is smaller than a predetermined level.

15. The handwritten data input apparatus according to claim 13, wherein the coordinate computation means informs the user of commencement of input of handwritten data when the pen device is determined to be at rest for a period longer than the first period and informs the user of termination of input of handwritten data when the pen device is determined to be at rest for a period longer than the second period.

16. The handwritten data input apparatus according to claim 15, wherein the coordinate computation means informs the user of commencement of input of handwritten data by means of sound or informs termination of input of handwritten data by means of sound.

17. A handwritten data input apparatus which acquires handwritten data written in midair by means of a user moving a pen device in midair, the apparatus comprising:

first camera means for acquiring first motion picture data pertaining to the pen device moved by the user;

second camera means for acquiring second motion picture data pertaining to the pen device from an angle different from that of the first camera means; and coordinate computation means for determining three-dimensional coordinates of the pen device in three-dimensional space on the basis of the sets of first and second motion picture data and determining time-series data pertaining to the coordinates, wherein the coordinate computation means recognizes a start time and end time of computation of handwritten data by means of external sounds.

18. A handwritten data input apparatus which acquires handwritten data written in midair by means of a user moving a pen device in midair, the apparatus comprising:

first camera means for acquiring first motion picture data pertaining to the pen device moved by the user;

second camera means for acquiring second motion picture data pertaining to the pen device from an angle different from that of the first camera means; and coordinate computation means for determining three-dimensional coordinates of the pen device in three-dimensional space on the basis of the sets of first and second motion picture data and determining time-series data pertaining to the coordinates, wherein the sounds are the voice of the user or sounds of a pen switch provided on the pen device.

19. A handwritten data input method by which handwritten data written in midair are acquired by means of a user moving a pen device in midair, the method comprising:

a first acquisition step of acquiring first motion picture data pertaining to a pen device moved by the user from a first angle;

a second acquisition step of acquiring second motion picture data pertaining to a pen device moved by the user from a second angle different from the first angle; and a coordinate computation step of determining three-dimensional coordinates of the pen device on the basis of the acquired sets of first and second motion picture data pertaining to the pen device and determining time-series data pertaining to the coordinates, wherein, in the coordinate computation step, coordinates of the pen device on the screen are computed from a start time in which the pen device has started moving on the screen from a stationary state longer than a predetermined first period until a stop time in which the pen device stops moving as a result of having entered a stationary state longer than a predetermined second period.

20. The handwritten data input method according to claim 19, wherein, in the coordinate computation step, the pen device is determined to be at rest when a change in coordinates of the pen device is smaller than a predetermined level.

21. The handwritten data input method according to claim 19, wherein, in the coordinate computation step, the user is informed of commencement of input of handwritten data when the pen device is determined to be at rest for a period longer than the first period and is informed of termination of input of handwritten data when the pen device is determined to be at rest for a period longer than the second period.

22. The handwritten data input method according to claim 21, wherein, in the coordinate computation step, the user is informed of commencement of input of handwritten data by means of sound or informs termination of input of handwritten data by means of sound.

23. A handwritten data input method by which handwritten data written in midair are acquired by means of a user moving a pen device in midair, the method comprising:

a first acquisition step of acquiring first motion picture data pertaining to a pen device moved by the user from a first angle;

a second acquisition step of acquiring second motion picture data pertaining to a pen device moved by the user from a second angle different from the first angle; and a coordinate computation step of determining three-dimensional coordinates of the pen device on the basis of the acquired sets of first and second motion picture data pertaining to the pen device and determining time-series data pertaining to the coordinates, wherein, in the coordinate computation step, a start time and an end time of computation of handwritten data are recognized by means of external sounds.

24. A handwritten data input method by which handwritten data written in midair are acquired by means of a user moving a pen device in midair, the method comprising:

a first acquisition step of acquiring first motion picture data pertaining to a pen device moved by the user from a first angle;

a second acquisition step of acquiring second motion picture data pertaining to a pen device moved by the user from a second angle different from the first angle; and a coordinate computation step of determining three-dimensional coordinates of the pen device on the basis of the acquired sets of first and second motion picture data pertaining to the pen device and determining time-series data pertaining to the coordinates, wherein the sounds are the voice of the user or sounds of a pen switch provided on the pen device.

* * * * *